United States Patent [19]

Dao et al.

[11] Patent Number: 4,928,223
[45] Date of Patent: May 22, 1990

[54] FLOATING POINT MICROPROCESSOR WITH DIRECTABLE TWO LEVEL MICROINSTRUCTIONS

[75] Inventors: Tich T. Dao; Gary R. Burke, both of Cupertino, Calif.

[73] Assignee: Fairchild Semiconductor Corporation, Cupertino, Calif.

[21] Appl. No.: 901,446

[22] Filed: Aug. 28, 1986

Related U.S. Application Data

[63] Continuation-in-part of Ser. No. 433,059, Oct. 6, 1982, abandoned.

[51] Int. Cl.$^5$ ............. G06F 9/00; G06F 9/22; G06F 9/26; G06F 13/00
[52] U.S. Cl. ................ 364/200; 364/232.8; 364/243; 364/243.3; 364/244.6; 364/247; 364/247.6; 364/262.4; 364/262.7; 364/262.8
[58] Field of Search ... 364/200 MS File, 900 MS File

[56] References Cited

U.S. PATENT DOCUMENTS

| | | | |
|---|---|---|---|
| 3,631,405 | 12/1971 | Hoff et al. | |
| 3,748,649 | 7/1973 | McEowen et al. | 340/172 |
| 3,766,532 | 10/1973 | Liebel, Jr. | 340/172 |
| 3,868,649 | 2/1975 | Sato et al. | |
| 3,886,523 | 5/1975 | Ferguson et al. | 340/172 |
| 4,032,895 | 6/1977 | Lanza | 364/200 |
| 4,138,718 | 2/1979 | Toke | 364/200 |
| 4,153,937 | 5/1979 | Poland | |
| 4,156,279 | 5/1979 | Wilhite | 364/200 |
| 4,173,041 | 10/1979 | Dvorak et al. | 364/200 |
| 4,224,676 | 9/1980 | Appelt | 364/712 |
| 4,307,445 | 12/1981 | Tredennick et al. | 364/200 |
| 4,323,964 | 4/1982 | Gruner | 364/200 |
| 4,325,121 | 4/1982 | Gunter et al. | 364/200 |
| 4,334,284 | 6/1982 | Wong | 364/748 |
| 4,338,661 | 7/1982 | Tredennick | 364/200 |
| 4,338,675 | 7/1982 | Palmer et al. | 364/748 |
| 4,346,436 | 8/1982 | Wise | |
| 4,399,505 | 8/1983 | Druke et al. | 364/200 |
| 4,434,462 | 2/1984 | Guttag et al. | 364/200 |
| 4,455,604 | 6/1984 | Ahlstrom et al. | 364/200 |

FOREIGN PATENT DOCUMENTS 1091355 12/1980 Canada.

OTHER PUBLICATIONS

The Organization of Microprogram Stores, Dasgupta, ACM Computing Surveys, vol. II, No. 1, Mar. 1979, pp. 39–65.
Microprogramming: A Tutorial and Survey of Recent Developments, Rauscher et al., IEEE Trans. on Computers, vol. C-29, No. 1, 1/80, pp. 2–19.
Architecture for VLSI-Circuits in Digital Signal Processing, Block et al., Proceedings of the IEEE International Conference on Circuits and Computers, vol. 2 of 2, Oct. 1–3, 1980, N.Y., pp. 1184–1187.
Speedup Arithmetic Functions While Using Less Software, Gordon, Electrical Design News, vol. 27, No. 11, May, 1982, pp. 167–171.
IBM Technical Disclosure Bulletin, vol. 22, No. 8B, Jan. 1980, entitled "Hibride Control Storage".
Article entitled "A Multiprocessor Architecture Adapted to VLSI Custom Design", J. M. C. Alves Marques, Microprocessor Systems: Software, Firmware and Hardware, Six Euromicro Symposium and Microprocessing and Microprogramming, Sep. 16–18, 1980, London, pp. 321–327, North-Holland Publishing Company, New Yor, Oxford.

Primary Examiner—David Y. Eng
Assistant Examiner—Emily Y. Chan
Attorney, Agent, or Firm—Lee Patch; Michael Glenn; William H. Murray

[57] ABSTRACT

A microprocessor integrator circuit includes split nanocode memories which enables simultaneous execution of an arithmetic operation and an operand fetch for maximizing through-put. The circuit also includes a shared sequencing arithmetic logic unit which handles all microcode sequencing plus memory address sequencing. The circuit also provides nanocode sequencing which enables storage of constants and data in a microcode space which can include an off-chip writable control store. In addition, two level microcode is utilized to enable long routines to be vertically encoded without the overhead of a large number of read only memory outputs.

7 Claims, 25 Drawing Sheets

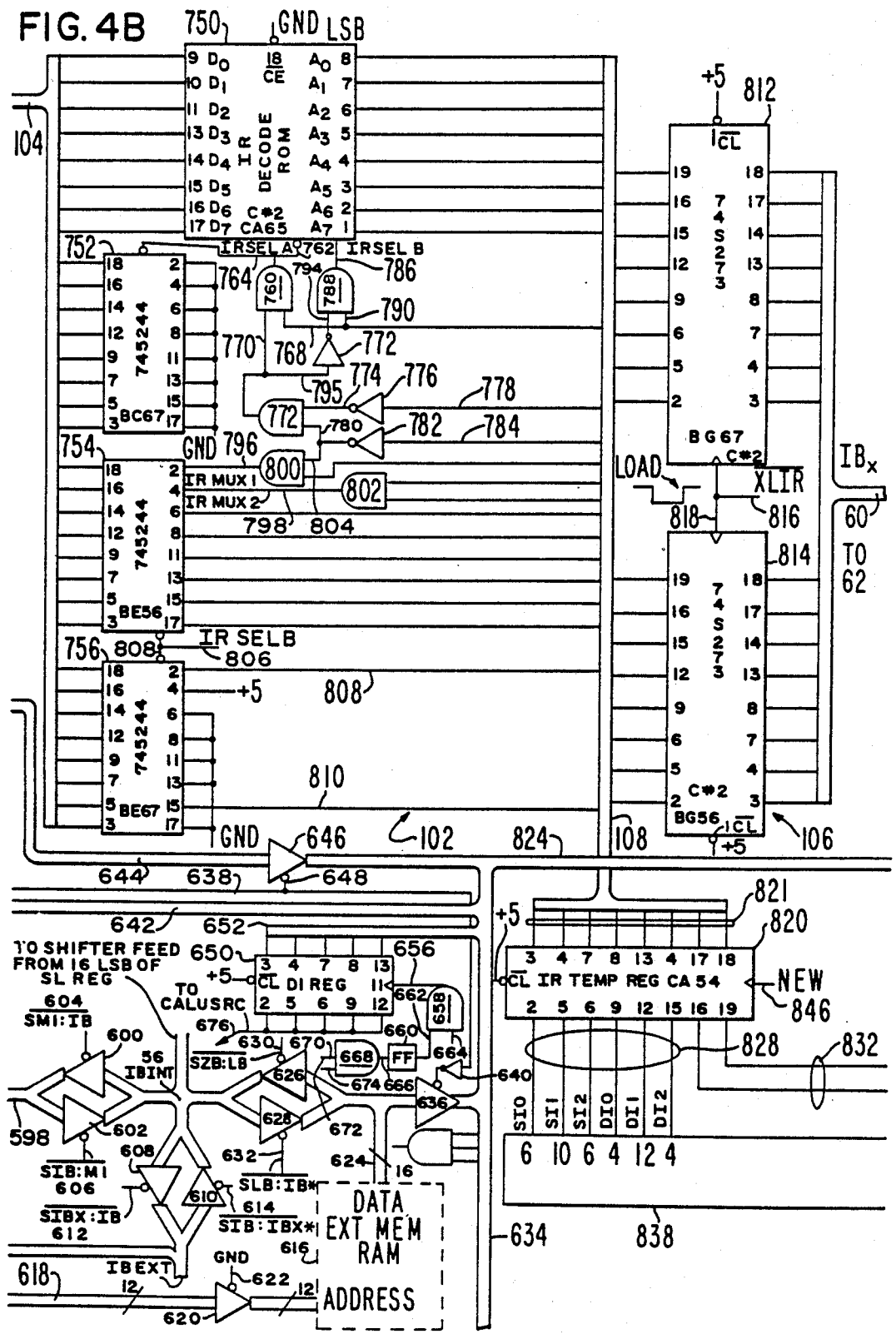

FIG. 7

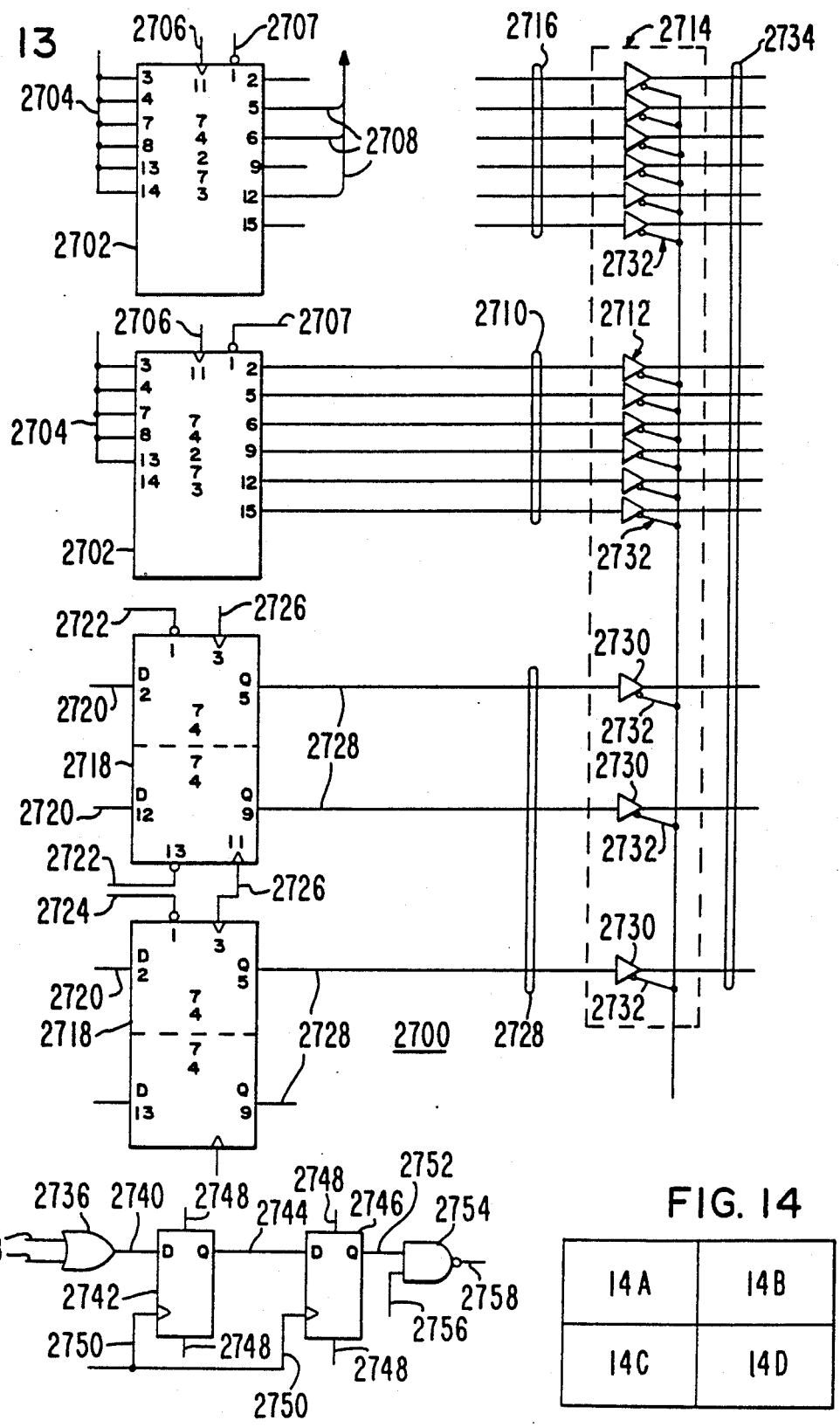

FLOATING POINT MICROPROCESSOR WITH DIRECTABLE TWO LEVEL MICROINSTRUCTIONS

This application is a continuation-in-part of patent application Ser. No. 433,059, filed October 6, 1982.

BACKGROUND OF THE INVENTION

This application relates to an improved system configuration for a microprocessor integrated circuit. More particularly, it relates to such improvements in microprocessor system design which are especially adapted to provide a floating point microprocessor capable of handling more complex operations than can be carried out with microprocessor system configurations in the prior art. Most especially, it relates to such a microprocessor system configuration and microprocessor integrated circuit which implements two level double sequenced control.

DESCRIPTION OF THE PRIOR ART

A conventional microprocessor integrated circuit, such as an F9445 microprocessor integrated circuit, obtainable from Fairchild Camera and Instrument Corporation, Mountain View, Californi; and Intel 8080, 8088, 8087, obtainable from Intel Corporation, Santa Clara, California; a Motorola 6800 or 68000, obtainable from Motorola, Incorporated, Phoenix Arizona; or a National Semiconductor 16000, obtainable from National Semiconductor Corporation, Santa Clara, California, all employ a series of elemental instructions called microcode for causing the microprocessors to carry out operations on data supplied to them. As conventionally practiced, the microcode is stored in a read only memory (ROM) or a programmable logic array (PLA) structure forming a part of the microprocessor integrated circuit. In particular, the Intel 8087 floating point microprocessor is believed to be described in U.S. Pat. No. 4,338,675.

The typical on chip microcode memory provides the microcode with a single level of control. Such a single level of control limits the number and complexity of microcode instructions that can be provided in a microprocessor integrated circuit, given the size constraints of even very large scale integration (VLSI) microprocessor integrated circuits.

For these and related reasons, the prior art has considered various approaches for introducing a hierarchical control system for microprocessor microcode storage and manipulation. The state of the prior art in such hierarchical control of microprograms is summarized in S. Dasgupta, "The Organization of Microprogram Stores", Computing Surveys, Volume II, No. 1, March 1979, pages 39–65; T. Rauscher and P. Adams, "Microprogramming: A Tutorial and Survey of Recent Developments," IEEE Transactions on Computers, Volume C-29, No. 1, January 1980, pages 2–19; and M. Raymond and D. Pucknell, "Aspects of Memory Hierarchy Concepts Extended to Microcode-Store Level", IEE Proceedings, Volume 128, Part E, No. 6, November 1981, pages 255–258.

In particular, it is known in the prior art to provide a two level control for microcode, with both levels of control having their code stored on a microprocessor integrated circuit. The higher level instructions are then termed microcode, and the more elemental level is termed nanocode. This approach eliminates much duplication of terms in different instructions which results from a single level control system, but some duplication still remains. Furthermore, because of the large number of connections required to both stores, off chip expansion of the microcode is still not practical. This approach has been extended in the prior art to a three level control scheme by adding a higher level of instructions, termed "macrocode". With a three level control scheme, a limited amount of off chip expansion of instructions becomes possible, but a substantial time delay penalty is required with three levels of macro-micro-nanacode. Although pipelining can reduce this delay somewhat, a three level control system is of only limited value in microprocessor integrated circuits.

External microcode has also been implemented in bit slice 4-bit microprocessors where it is easier to implement, since all the microcode is off the chip.

The attractiveness of implementing external microcode in microprocessor integrated circuits is thus appreciated in the prior art. However, despite considerable development to date, there remains a need for further improvement in techniques for implementing such external microcode in order to allow user specification of microcode, without long delay cycles inherent in having user microcode implemented in the microprocessor integrated circuit itself during its fabrication.

SUMMARY OF THE INVENTION

Accordingly, it is an object of this invention to provide an improved hierarchical control scheme for a microprocessor which will increase the complexity of instructions that can be executed with the microprocessor.

It is another object of the invention to provide such a control scheme that will further permit more complex user-defined instructions than possible in the prior art to be stored externally of the microprocessor integrated circuit, yet be treated by the microprocessor in the same manner as internally stored instructions.

It is still another object of the invention to provide a system organization for a microprocessor which will operate efficiently with a hierarchical control scheme.

The attainment of these and related objects may be achieved through use of the novel microprocessor system and microprocessor integrated circuit disclosed herein. In one aspect of the invention, this microprocessor integrated circuit has an instruction sequence register connected to supply an instruction address to a first level instruction memory. An instruction register is connected to receive an instruction from the first level instruction memory. A terminal on the microprocessor integrated circuit is preferably connectable to an external, additional first level instruction memory to supply an address from the instruction sequence register to the external memory. Another terminal on the microprocessor integrated circuit is also preferably connectable to supply an instruction from the first level external instruction register to the instruction register. A second level instruction PLA is connected to receive an address from the instruction register. A second level instruction memory is also connected to receive an address from the first level instruction register. The instruction register is also preferably connected to supply an address to the instruction sequence register. Outputs from the second level instruction PLA also preferably control the instruction sequence register. Outputs from the second level instruction memory also preferably control data movement in the microprocessor integrated circuit.

In another aspect of the invention, the microprocessor integrated circuit has a means for storing a first level of microinstructions, a means for storing a first portion of a second level of microinstructions and separate means for storing a second portion of the second level of microinstructions. The first level microinstruction storing means determines to which of the second level microinstruction storing means a particular second level microinstruction is directed.

In a further aspect of the invention, the microprocessor integrated circuit includes a first memory means for storing a plurality of microinstructions and a decoding means for output signals based on a selected one of the microinstructions. A second memory means is connected between the first memory means and the decoding means. The second memory means stores source, destination and type fields of a selected one of the microinstructions stored in the first memory means.

In still another aspect of the invention, the microprocessor integrated circuit includes a first memory means for storing microinstructions and means for connecting an external microinstruction and operand memory means to the integrated circuit. An information bus is connected between the microinstruction storage first memory means and the connecting means for supplying microinstructions and operands from the external memory means to the first memory means.

Providing a system organization as set forth above in a microprocessor integrated circuit enables time delays in prior art hierarchical microcode microprocessor systems to be reduced and also permit the use of essentially any user defined microcode in the microprocessor integrated circuit of this invention. The microprocessor of this invention is a high speed processor intended mainly for arithmetic and numeric applications requiring real time response and high speed operation.

The attainment of the foregoing and related objects, advantages and features of the invention should be more readily apparent to those skilled in the art after review of the following more detailed description of the invention, taken together with the drawings, in which:

BRIEF DESCRIPTION OF THE DRAWINGS

FIGS. 4A, 4B, 4C and 4D, keyed together as shown in FIG. 4, is a structural block diagram of a control path portion of the floating point microprocessor integrated circuit shown in FIG. 2.

Figure 7:
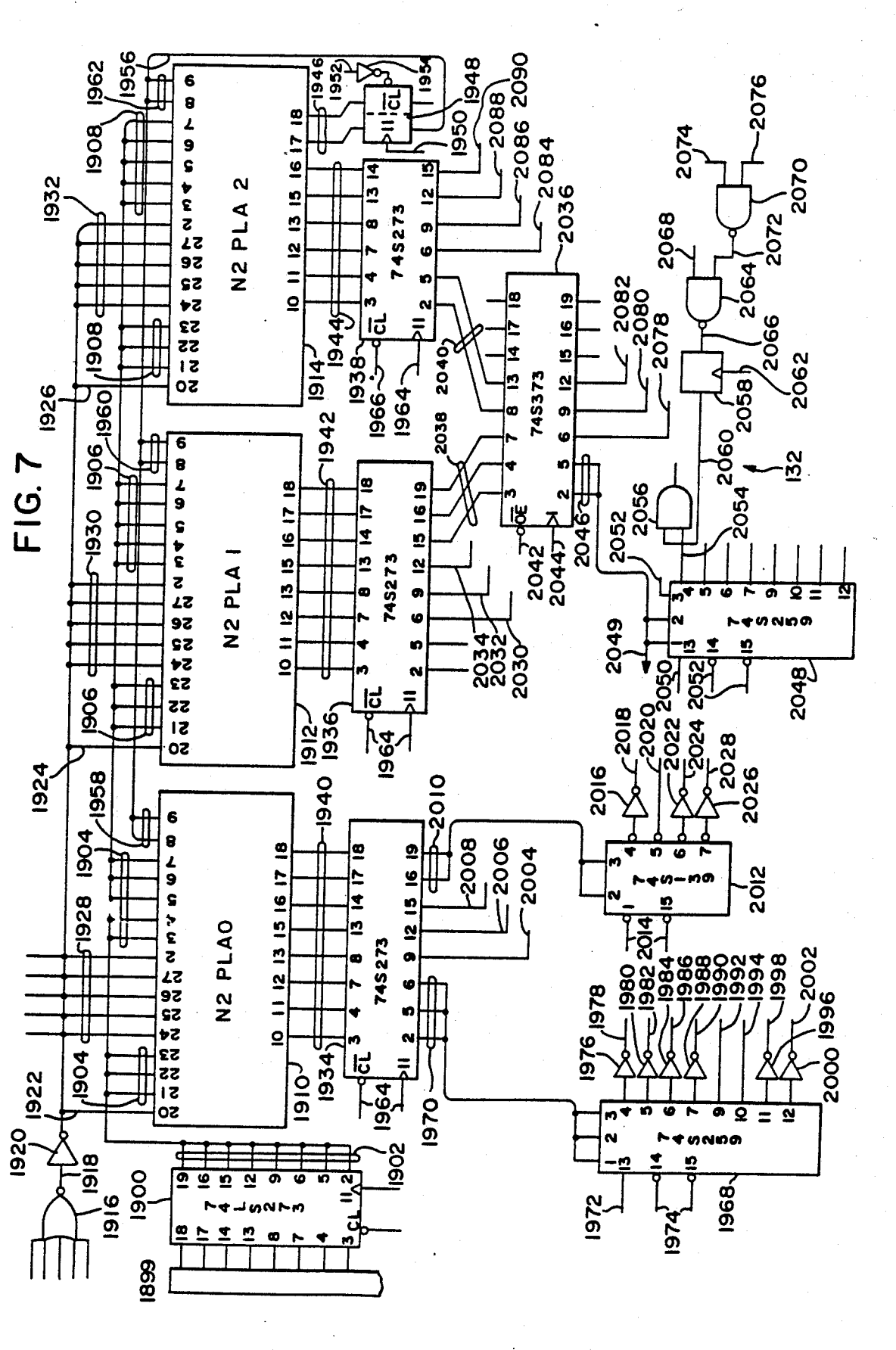

FIG. 7 is a block diagram of a nanocode 2 programmed logic array portion of the floating point microprocessor integrated circuit shown in FIG. 2.

FIG. 13 is a block diagram of a control register in the control, timing and interface portion of the floating microprocessor integrated circuit shown in FIG. 1.

DETAILED DESCRIPTION OF THE INVENTION

Figure 1:
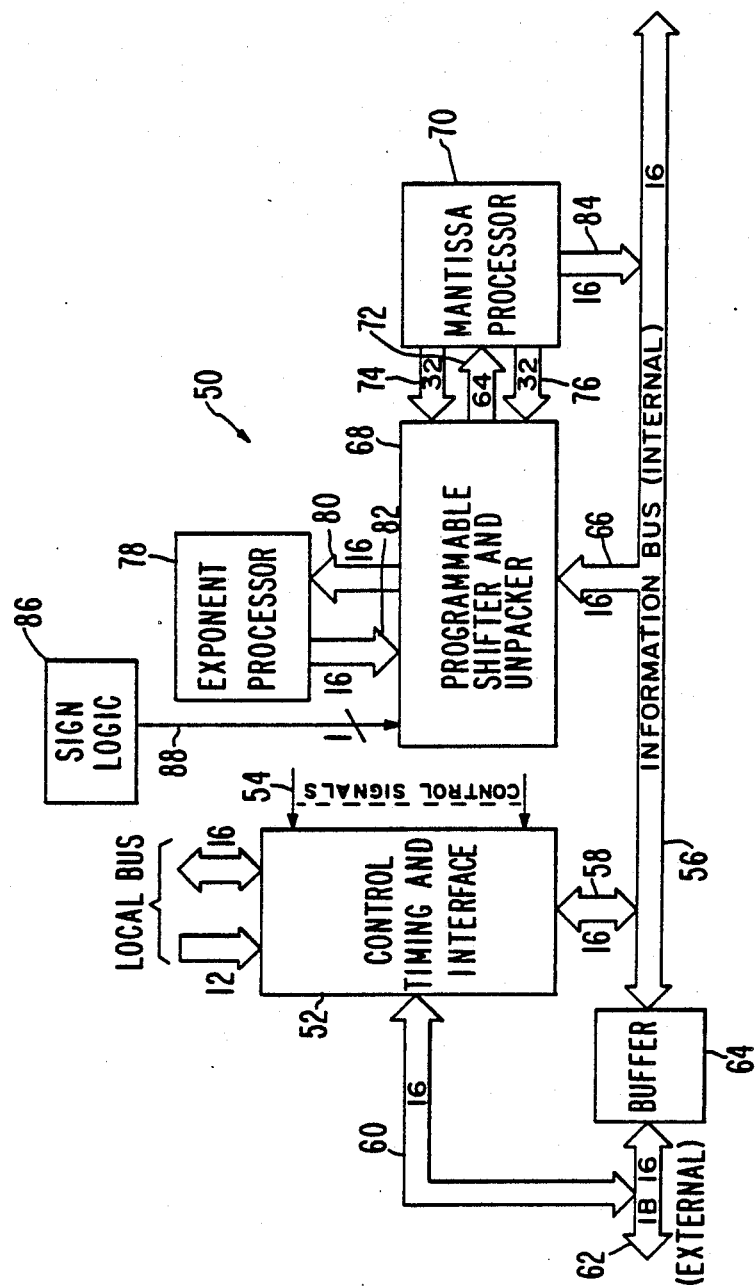
FIG. 1 is a functional block diagram of a floating point microprocessor integrated circuit in accordance with the invention.

Turning now to the drawings, more particularly to FIG. 1, the functional elements of a microprocessor integrated circuit 50 in accordance with the invention are depicted. The microprocessor 50 includes a control, timing and interface section 52 connected by control signal lines 54 to each of the other functional elements shown. These connections have been omitted for clarity in the diagram. The control, timing and interface section 52 is further connected to a 16 bit wide internal information bus 56 by bus 58, also 16 bits in width. Bus 60 also connects the control, timing and interface section to a 16 bit wide external information bus 62. Suitable buffer circuits 64 connect the external information bus 62 to the internal information bus 56. The internal information bus 56 is connected by bus 66 to a programmable shifter and unpacker section 68. The programmable shifter and unpacker section 68 is connected to a mantissa processor 70 by a 64 bit wide bus 72 and by two 32 bit wide buses 74 and 76. Similarly, the programmable shifter and unpacker 68 is connected to an exponent processor 78 by 16 bit wide buses 80 and 82. The mantissa processor 70 is also connected to the internal information bus 56 by bus 84. Sign logic circuits 86 are connected to the programmable shifter and unpacker section by line 88.

The mantissa processor 70 includes the following elements, which will be explained in more detail below: a 32 bit arithmetic and logic unit (ALU), a variable width register file, working registers and flipflops, control PLAs, detection logic and bus buffers. There are eight 32 bit registers in the register file, or four 64 bit registers, depending on operating mode. The information in the registers is stored from left to right with zeros filled in the places not defined by the format. There are three 32 bit working registers. Two additional 32 bits registers from the unpacker section 68 can also be used as working registers if necessary.

The exponent and sign processor 78 consists of the following functional blocks: a 16 bit wide ALU, variable width register file, working registers, constants, PLAs, detection logic and sign logic and flipflops. There are eight 8 bit registers in the file or four 16 bit registers. The information is stored starting from the least significant bit of the registers. When using the 8 bit registers in the 16 bit ALU, the most significant bit is zeros. When using 16 bit registers in the ALU, the bits of the exponents that are not defined by the formats are filled with zeros. The sign of the operands are stored in eight or four flipflops, depending on the precision required, and the calculations of the result sign are performed separately. There are two 16 bit working registers. One additional register is available from the unpacker in unit 68 with the same restrictions mentioned above.

The programmable shifter and unpacker 68 is a 64 bit wide shifter capable of shifting in one machine cycle from 0 to 8 positions to the left or 0 to 24 positions to the right (not continuous ranges). In order to enable efficient shifting, the shift control logic detects the ranges of required shifting, i.e., 0; 8; 16; 24; 32; and then performs the shifting in a minimum number of machine cycles. The shifter of unit 68 is implemented by two level banks and can be programmed by the shift control logic in control timing and interface section 52 to the required number of shifts. The programable shifter and unpacker 68 also receives operands from the internal information bus 56, represented in one of the standards recognized by the microprocessor, and unpacks them to sign, exponent and mantissa according to internal representation formats. These unpacked parts of the operand are stored in the corresponding units for future computations. There are two 32 bit registers and two eight bit registers associated with the unpacker portion of the unit 68. These registers also serve to store memory operands. In the applicable IEEE standared, denormalized operands will be unpacked to be stored with their exponent equal to 1. Zero operands will be stored with their exponent equal to 0.

The control, timing and interface section 52 generates all of the timing and control signals for the microprocessor and the interface signals enabling the microprocessor to communicate with a host CPU and main memory of a data processing system incorporating the microprocessor 50. The control, timing and interface section 52 is based on a two level microprogramming scheme in accordance with the invention to save microcode and to optimize execution times on a dynamic microcycle. The basic microcycle is 200 nanoseconds, with an extension to 300 nanoseconds when required for certain operations, to be explained more fully below.

Results of operations in the microprocessor 50 shown functionally in FIG. 1 should be packed to their packed format before being sent to main memory. For this purpose, the programmable shifter portion of section 68 and two of the 32 bit working registers are employed. The packing process takes place only when results are to be sent to main memory.

For use without external microcode, a microprocessor in accordance with FIG. 1 may be provided in a standard 40 pin integrated circuit package. In addition, an extended pin version of the microprocessor integrated circuit may be provided with extra pins for off chip user microcode. The pins have the significance shown in Table 1 below.

| Signal | No of Pins | Type | Active | Description |
|---|---|---|---|---|
| IB0 IB15 | 16 | I/O | H | Bi-directional address/data bus. |
| CE/DS | 1 | I | L | chip enable and Data strobe |
| ADDR0, 1 | 2 | I | H | Read: ST, CW. Write: IR, CW, AR1, AR2 |
| W | 1 | I/O | L | Read/Write |
| SPARE | 1 | — | — | — |
| STBDMA | 1 | O | L | DMA data strobe |
| STBADMA | 1 | O | L | DMA address strobe |
| BRQ | 1 | O | L | "Bus request" for DMA "TEST" |
| BACK | 1 | I | H | "Bus acknowledge" for DMA |
| READY | 1 | I/O | H | "Data ready" for handshake |
| ER0 | 1 | O | L | "Exceptions"-Interrupt request |
| BSYR0 | 1 | O | L | "Busy" - Interrupt request |
| PRI | 1 | I | L | Priority for Multiple FPP's |
| CLK | 1 | I | H | CPU clock. 16 + 20 MHz |
| RST | 1 | I | L | External reset |
| Vcc | 1 | I | — | 5V ± 10% |
| GND | 2 | I | — | Ground |
| I inj | 1 | I | — | Injection current: 400 mA |
| Spare | 5* | — | — | * only for 40 pin version |
| Total | 40 | — | — | |

For use with an external microcode in an off chip ROM or other suitable memory, the microprocessor integrated circuit in accordance with FIG. 1 may be provided on an extended, 64 pin package. In addition to the pins and signals specified in Table I, such a 64 pin package has the additional pins and signals shown below in Table II.

TABLE II

| Signal | No. of Pins | Type | Active | Description |
|---|---|---|---|---|
| LADD$_0$ + LADD$_{11}$ | 12 | O | L | Local "ROM/RAM" Address |
| LDAT0 + LDAT$_{15}$ | 16 | I/O | L | Local "ROM/RAM" Data |
| LW | 1 | O | L | Local "RAM" Write |

When using the 64 pin package without an off chip memory, the 29 additional pins will be tied to "1". This will cause an all "1" microinstruction to be read and later treated as an illegal operation within the microprocessor integrated circuit 50.

Figure 2:
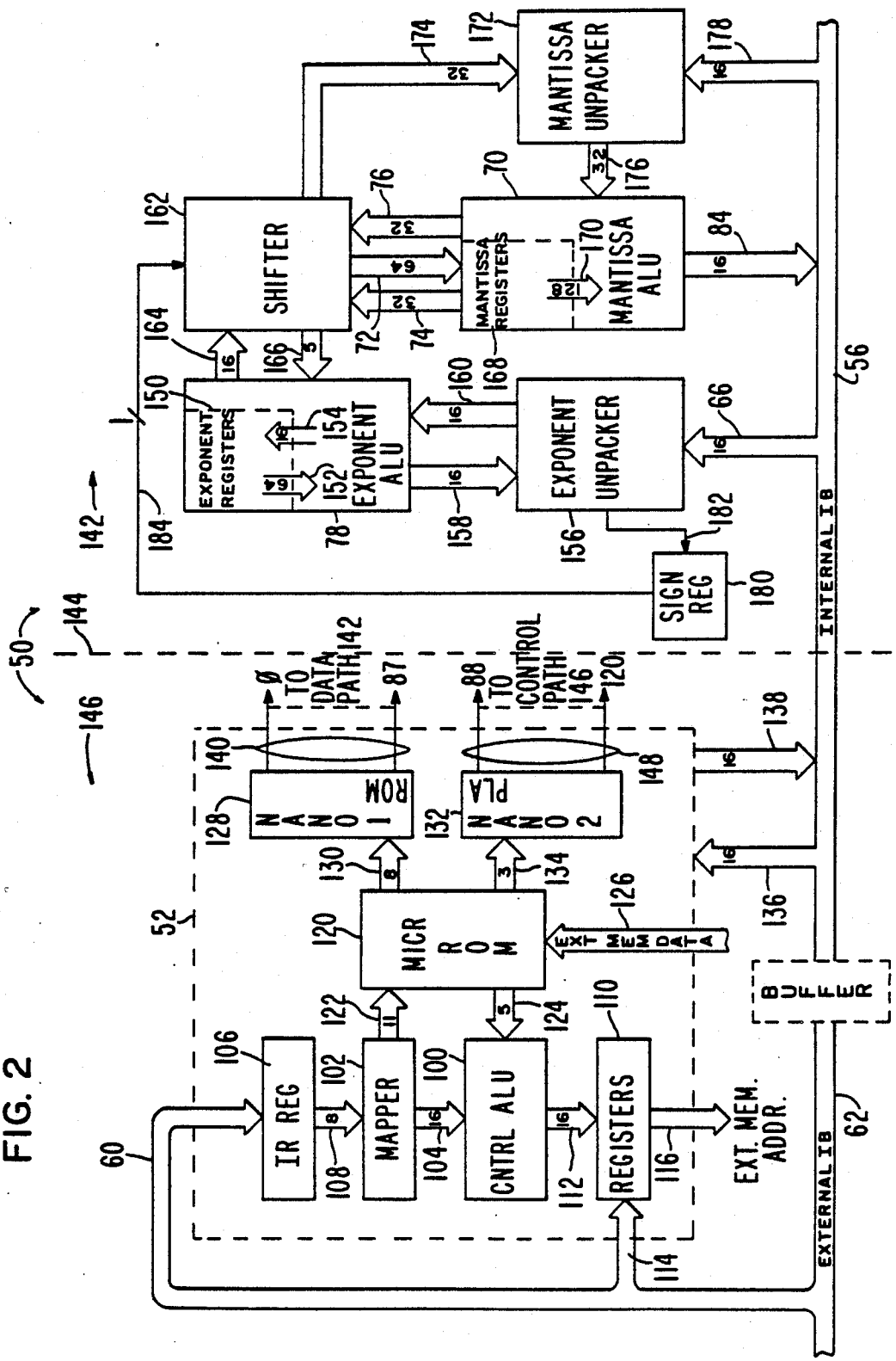
FIG. 2 is a structural block diagram of another embodiment of a floating point microprocessor integrated circuit in accordance with the invention.

FIG. 2 shows another embodiment of the microprocessor integrated circuit of the invention in somewhat more detail. The control, timing and interface section 52 includes a control arithmetic logic unit (ALU) 100. The control ALU is connected to mapping circuits 102 by bus 104. An instruction register (IR) 106 is connected to the mapping circuit 102 by bus 108. Bus 60 connects the IR 106 to the external information bus 62. The control ALU 100 is connected to output registers 110 by bus 112. The output registers are also connected to bus 60 by bus 114. Outputs from the output registers 110 are provided as external memory addresses on bus 116. A microcode ROM 120 is connected to the mapping circuit 102 by bus 122, and to the control ALU 100 by bus 124. Data from an external memory (not shown) is supplied to the microcode ROM by bus 126. Nanocode 1 ROM 128 is connected to the microcode ROM 120 by bus 130. Nanocode 2 PLA 132 is connected to the microcode ROM 120 by bus 134. Internal information bus 56 is connected to the control, timing and interface 52 for two way communication by buses 138 and 138. A total of 88 output lines 140 from nanocode 1 ROM 128 supply information as data to data path 142, indicated to the right of line 144. The elements to the left of line 144 constitute a control path 146. Output lines 148 from nanocode 2 PLA 132 are connected to various points in the control path 146.

Turning to the data path 142, exponent processor or ALU 78 includes a plurality of exponent registers 150, connected to the remainder of the ALU by buses 152 and 154. The exponent ALU 78 is connected to an exponent unpacker 156 by buses 158 and 160. The exponent unpacker 156 constitutes a portion of the programmable shifter and unpacker 68 shown in FIG. 1. The exponent ALU is also connected to shifter 162 by buses 164 and 166. The shifter 162 constitutes another portion of the programmable shifter and unpacked 68 shown in FIG. 1. The shifter 162 is connected to mantissa processor or ALU 70 by buses 72, 74 and 76. The mantissa ALU 70 includes a plurality of mantissa registers 168, connected to the rest of the mantissa ALU 70 by bus 170. The mantissa ALU 70 is connected to the internal information bus 56 by bus 84. The internal information bus 56 is connected to the exponent unpacker 156 by bus 66. Shifter 162 is connected to mantissa unpacker 172 by bus 174. The mantissa unpacker 172 constitutes another portion of the programmable shifter and unpacker 68 shown in FIG. 1. The mantissa unpacker 172 is connected to the mantissa ALU 70 by bus 176 and to the internal information bus 56 by bus 178. Sign register 180 is connected to exponent unpacker 156 by line 182 and to shifter 162 by line 184.

Figure 3A:
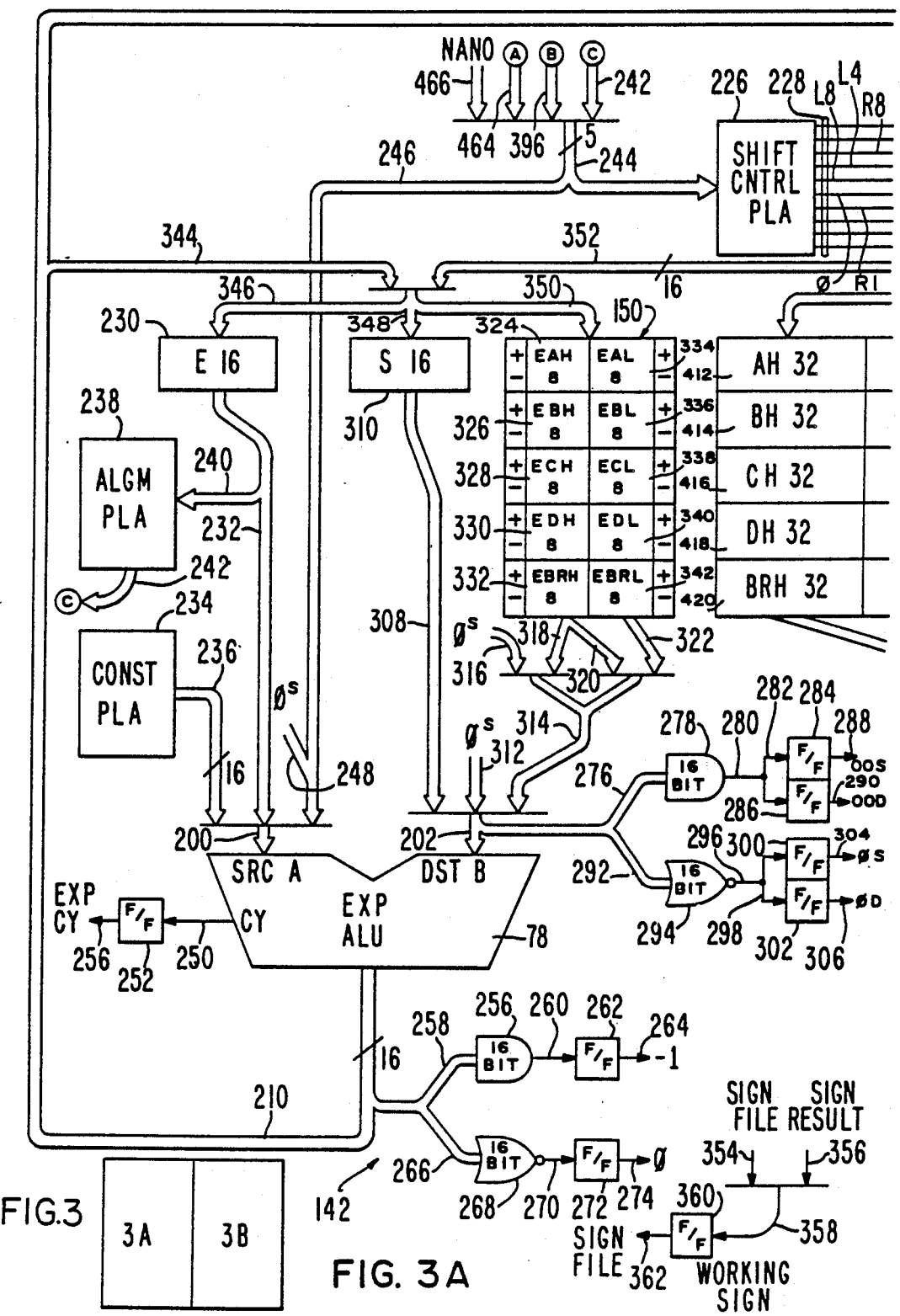
FIGS. 3A and 3B, keyed together as shown in FIG. 3, is a more detailed block diagram of a data path portion of the floating point microprocessor integrated circuit shown in FIG. 2.
Figure 3B:
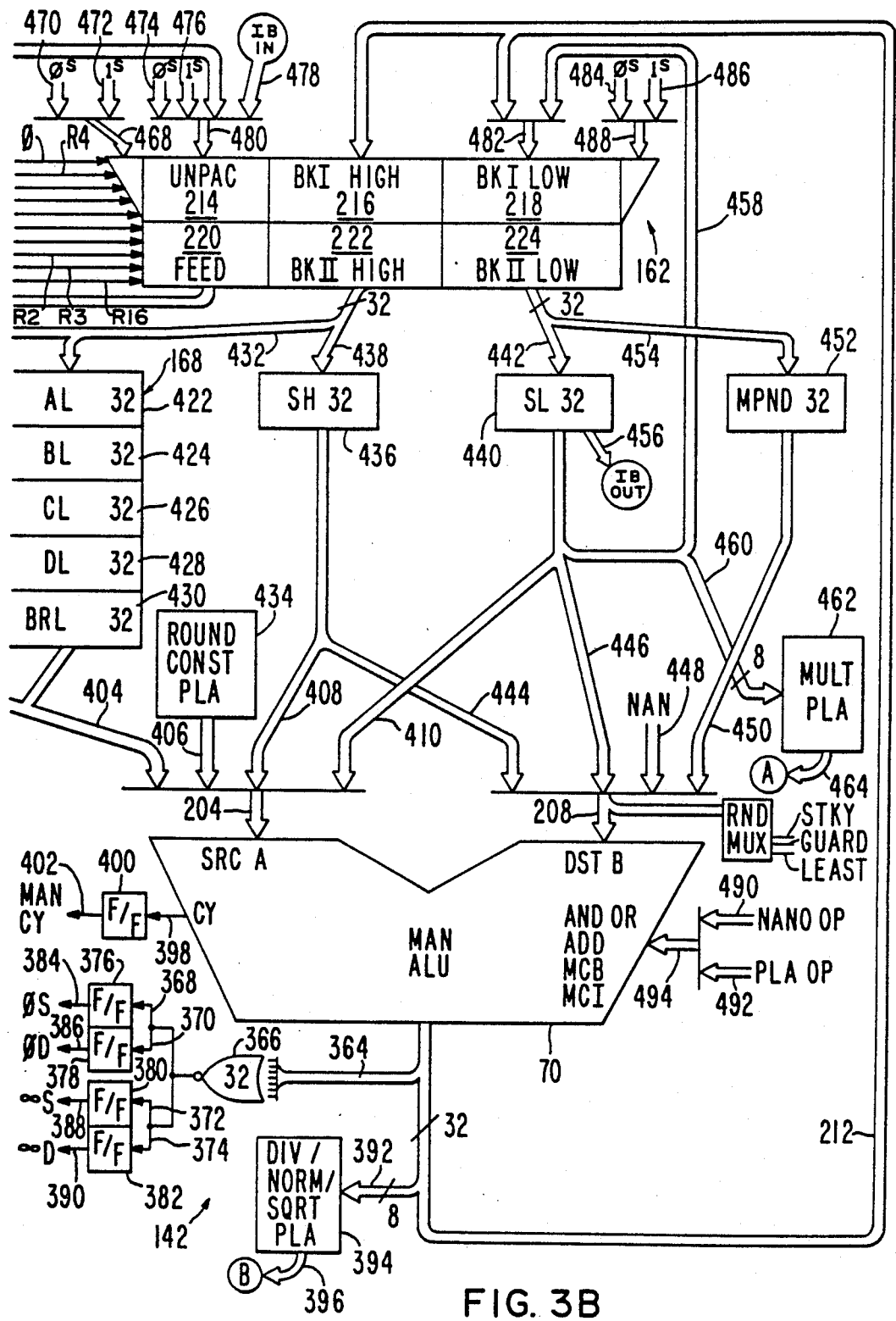
Figure 4D:
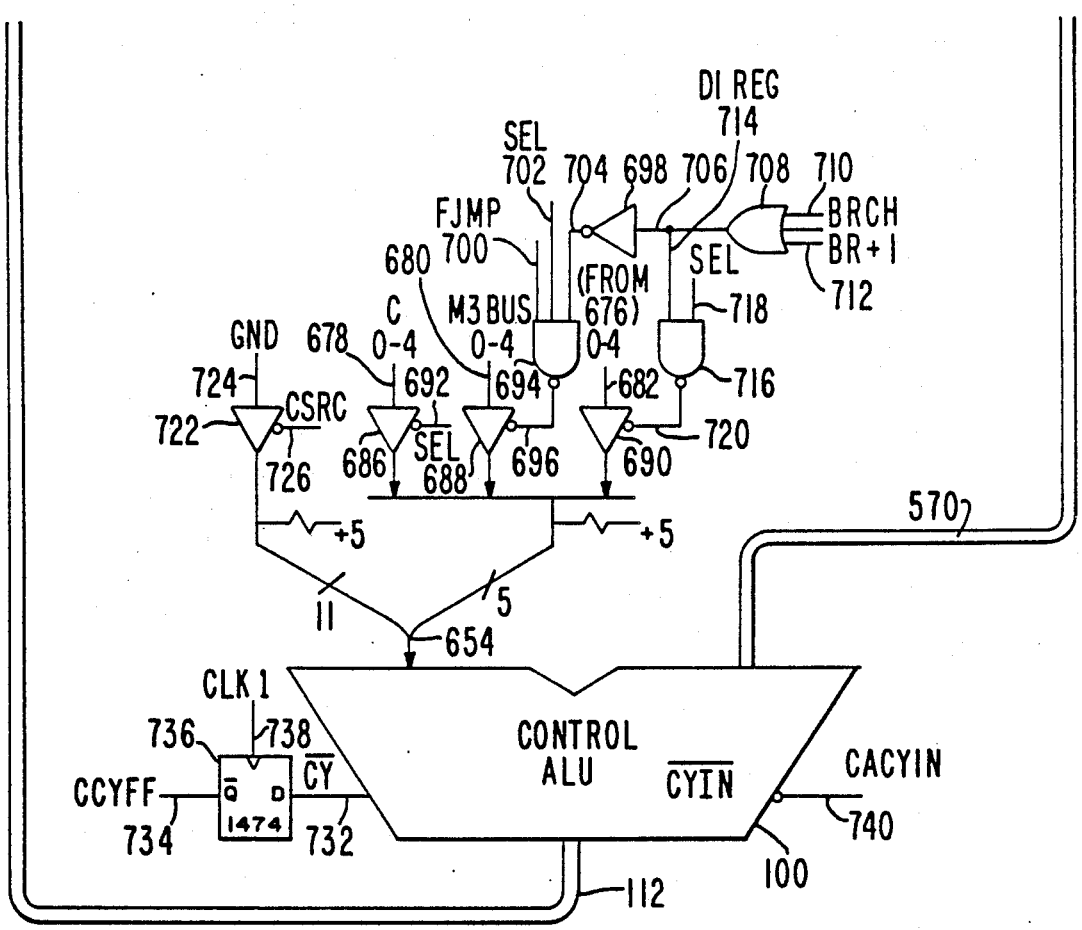
Figure 4A:
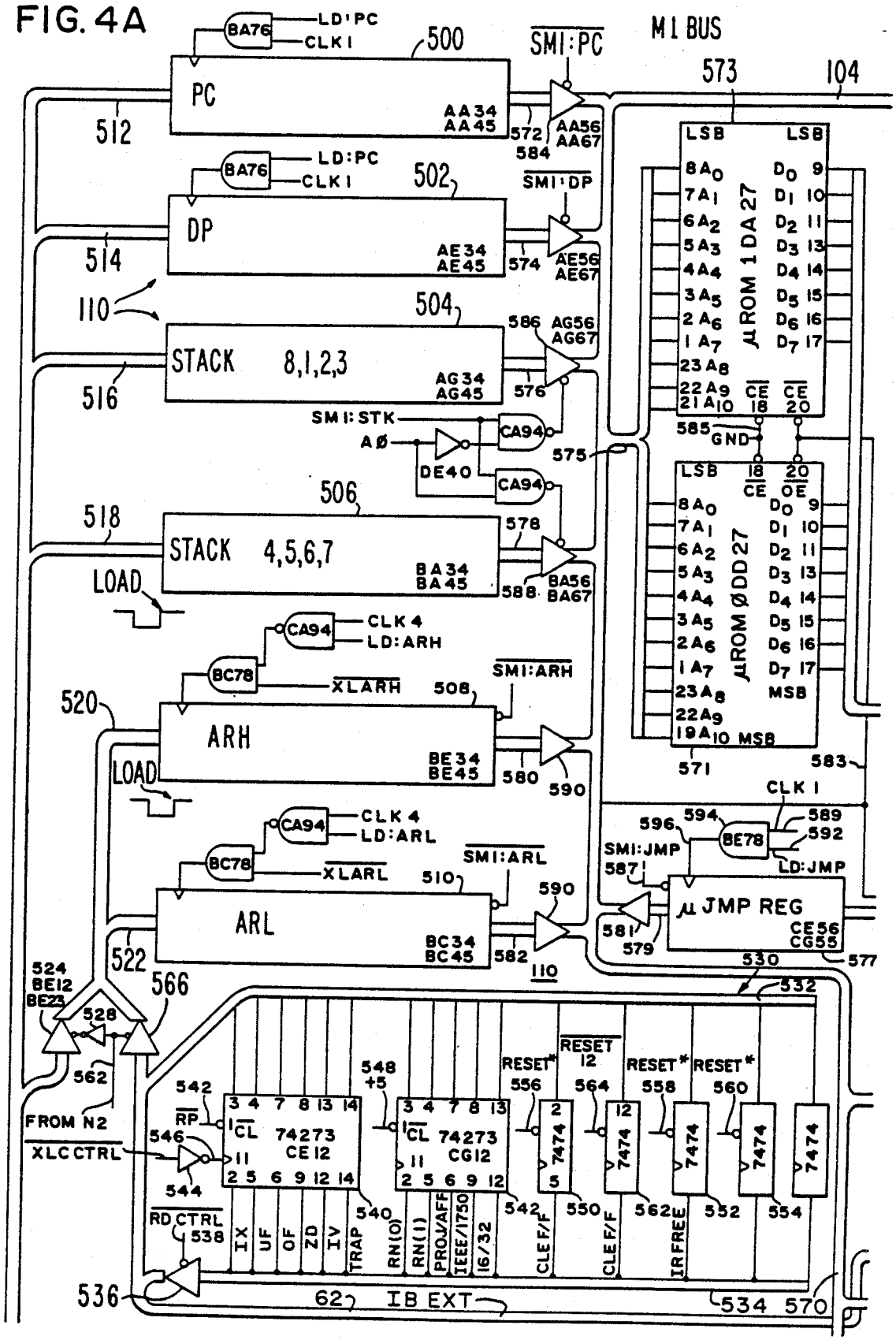
Figure 4C:
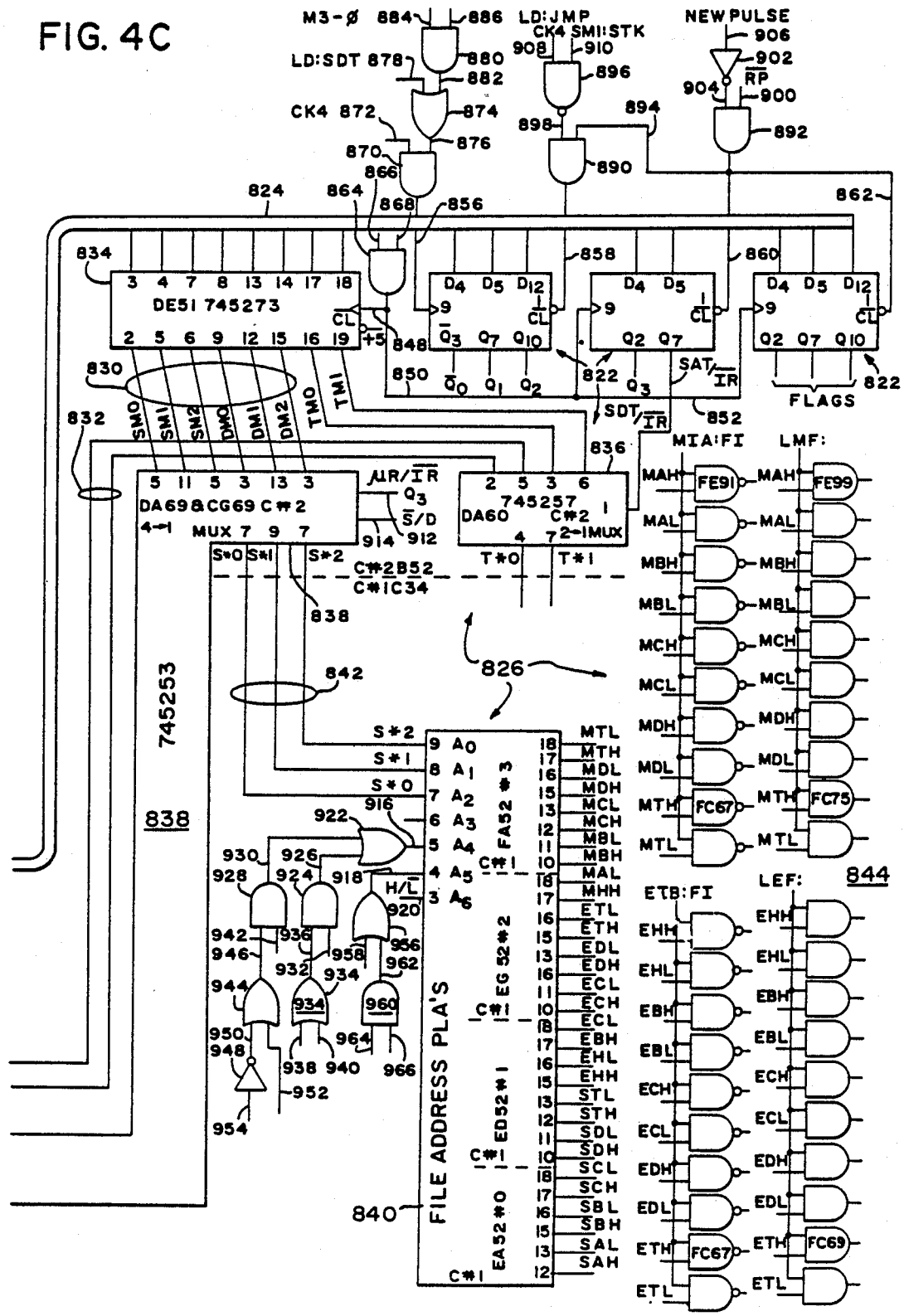
Figure 5A:
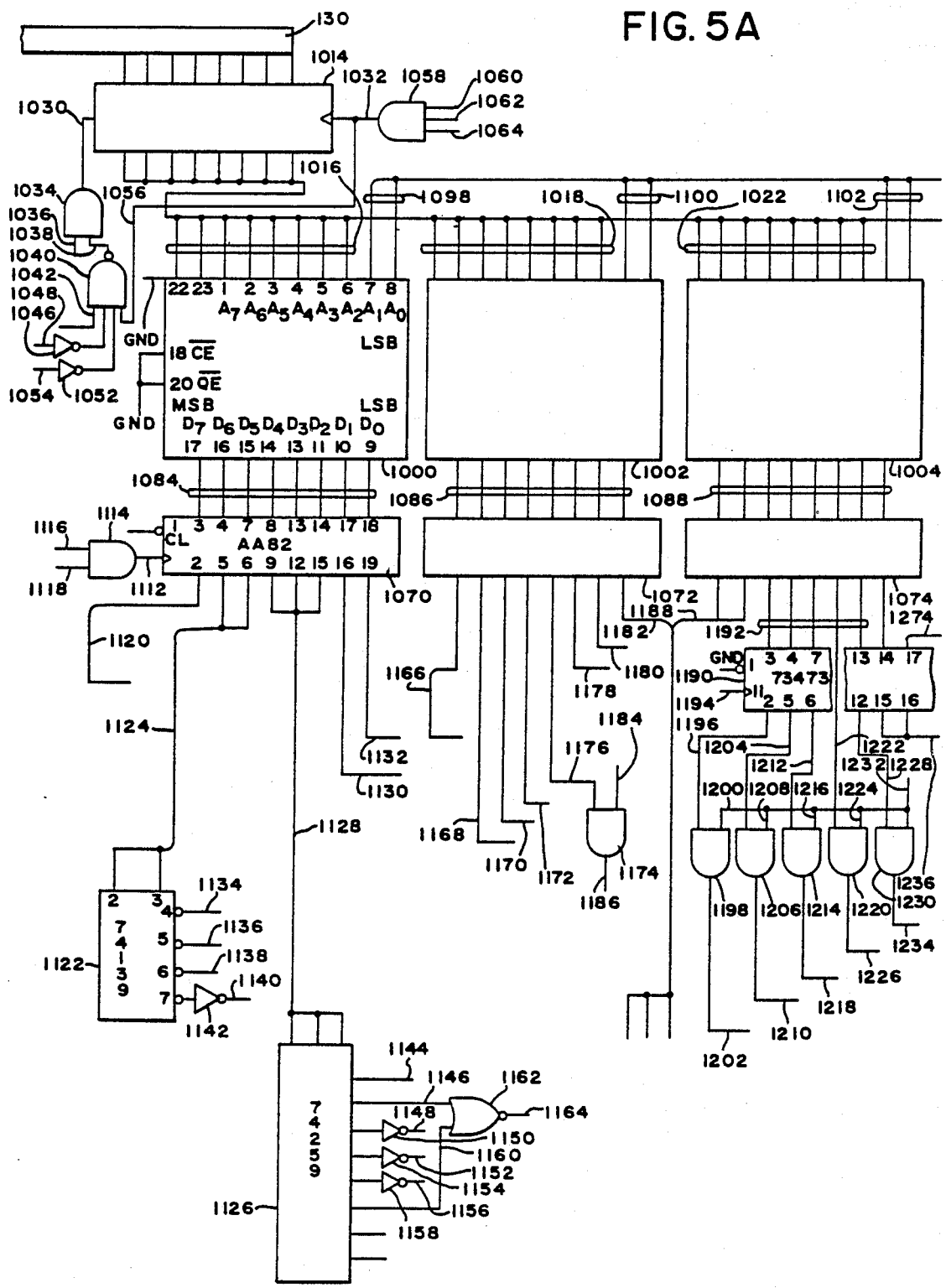
FIGS. 5A, 5B, 5C and 5D, keyed together as shown in FIG. 6, are block diagrams of a nanocode 1 random acess memory in the control path portion of the floating point microprocessor integrated circuit shown in FIG. 2, as well as associated decode circuits.
Figure 5B:
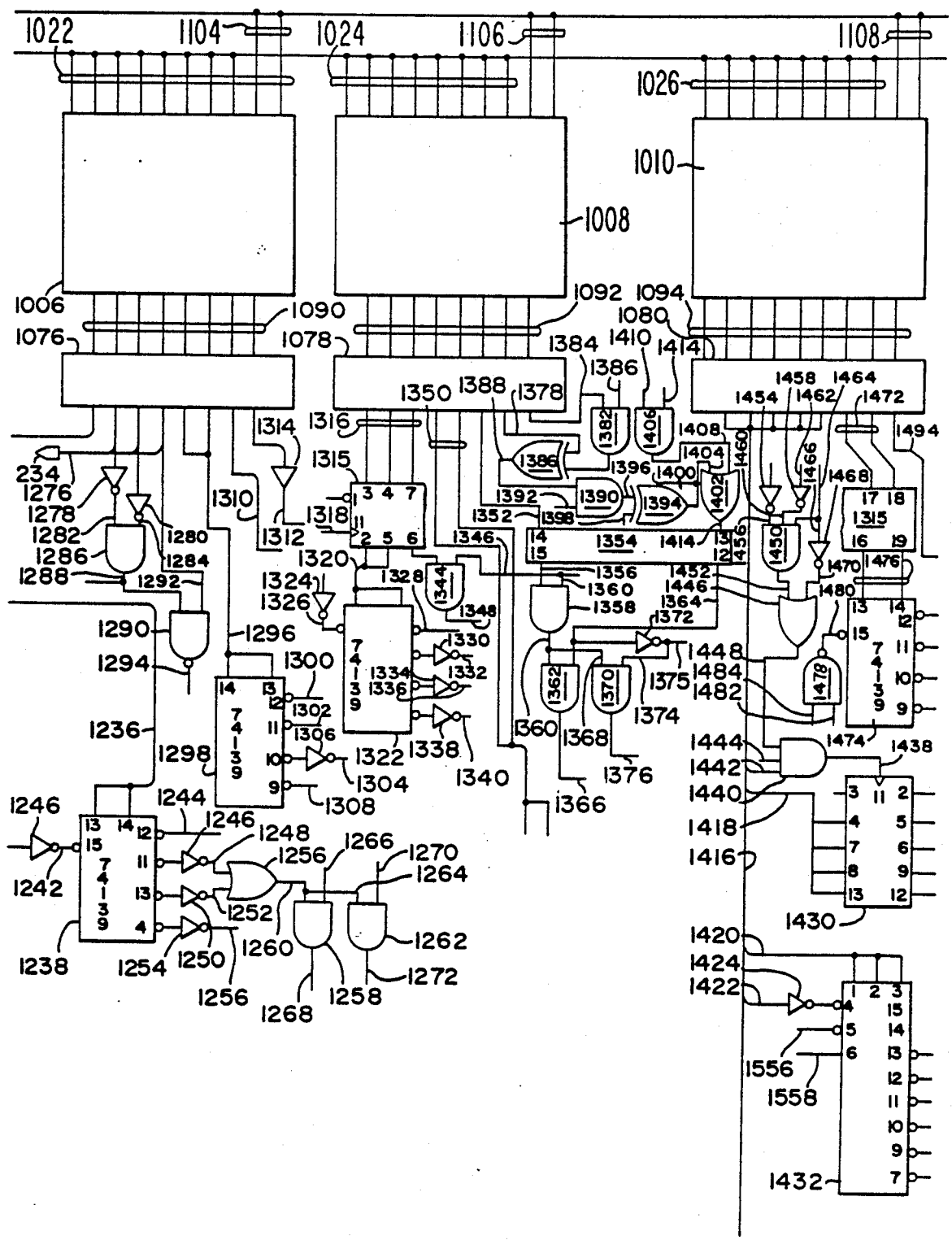
Figure 5C:
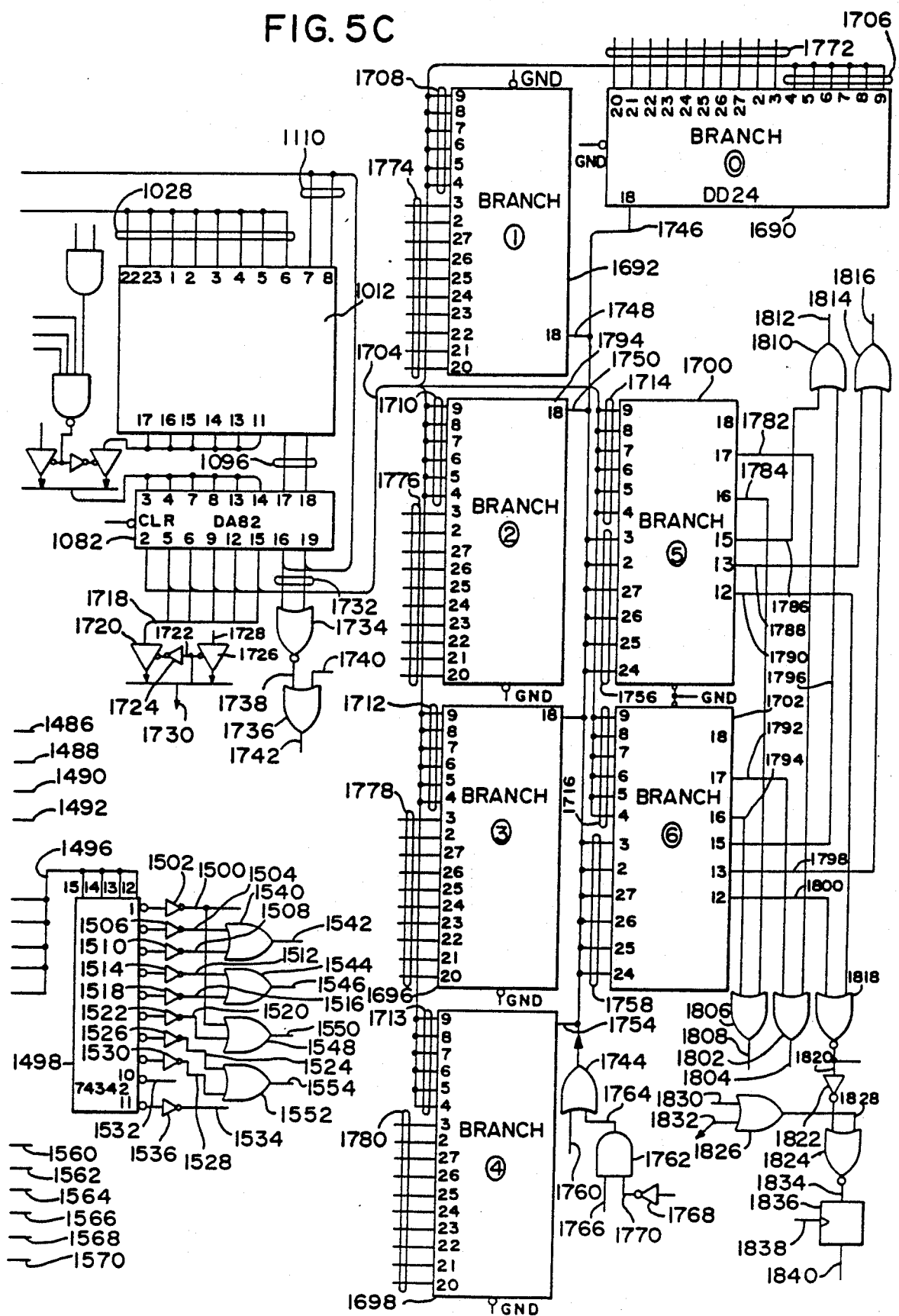
Figure 5D:
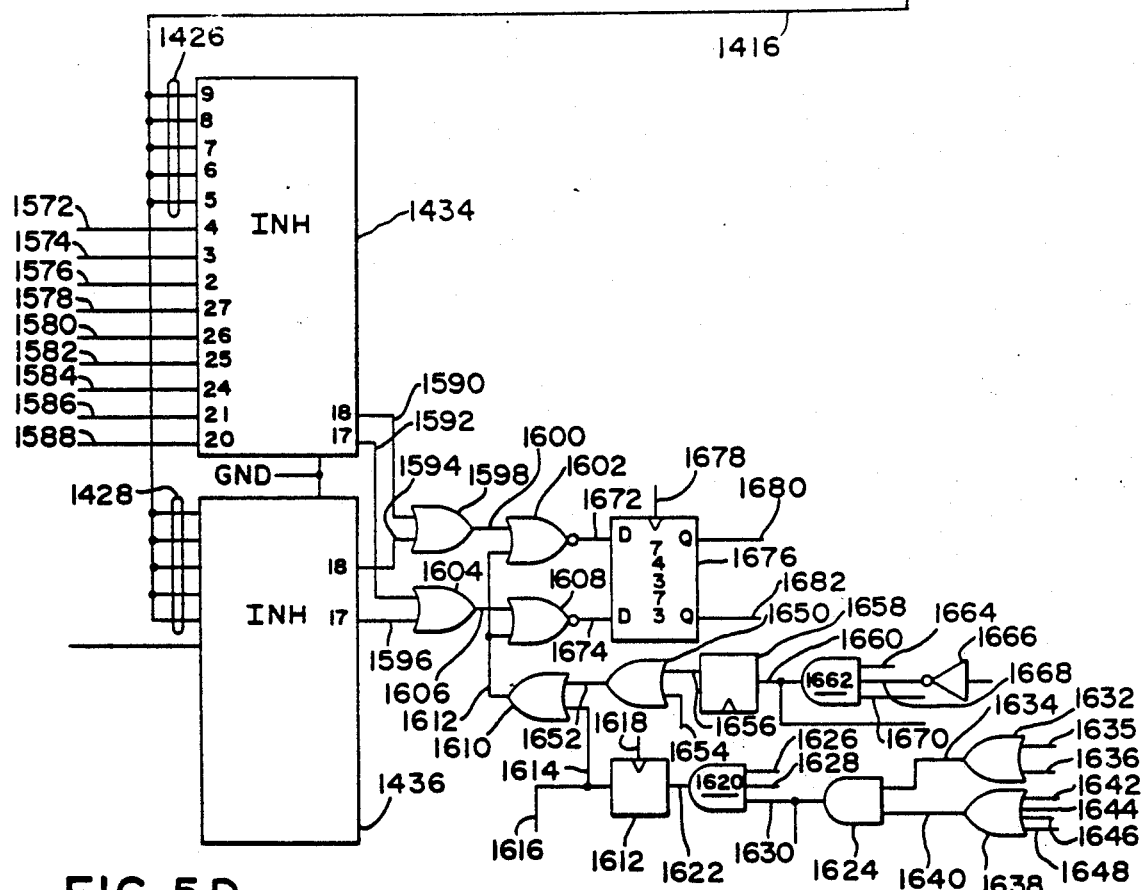
Figure 6:
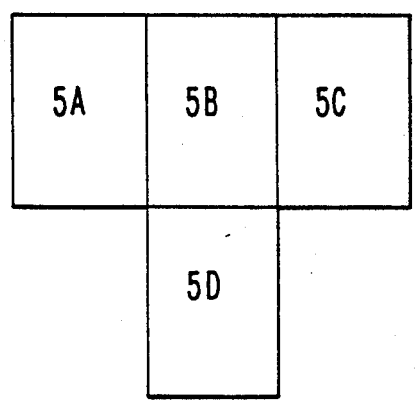

Further details on the data path 142 shown in FIG. 2 are shown in FIGS. 3A and 3B. The exponent ALU 78 and the mantissa ALU 70 respectively receive source and destination inputs on buses 200, 202, 204, and 208. Outputs from the exponent ALU 78 and the mantissa ALU 70 are respectively supplied on buses 210 and 212 to shifter 162. The shifter 162 is implemented with shiftable registers 214, 216, 218, 220, 222 and 224. A shift control PLA 226 is connected to the shifter 162 by lines 228. An exponent register 230 provides one source input to source bus 200 on bus 232. Another source input to bus 200 is supplied by constant PLA 234 on bus 236. The output of exponent register 230 is also supplied as an input to alignment PLA 238 by bus 240. A feedback loop from the alignment PLA 238 is supplied at its output bus 242, connected to form one input to shift control PLA 226 on bus 244. The ouput of alignment PLA 238 may also constitute a third source input on bus 200, via bus 246. An ALLO signal may also be supplied on bus 246 from bus 248, as a fourth source input to ALU 78. ALU 78 provides a carry signal on line 250 to flipflop 252, which provides an exponent carry signal on line 254. Output bus 210 from the exponent ALU provides an input to a 16 bit AND gate 256 on bus 258. The 16 bit AND gate 256 provides an output signal on line 160 to flipflop 262. The output of flipflop 262 is a −1 signal on line 264. The output from ALU 78 is also supplied on bus 266 to 16 bit NOR gate 268. The output of NOR gate 268 is supplied on line 270 to flipflop 272, the output of which is supplied on line 274 as a 0 signal. The −1 and 0 signals are employed in the sign register 180 (FIG. 2) as will be explained in more detail below.

The destination B input on bus 202 to the exponent ALU 78 is also supplied on bus 276 to AND gate 278. The output of AND gate 278 is supplied on lines 280 and 282 to flipflops 284 and 286. The outputs of flipflops 284 and 286, respectively, on lines 288 and 290 represent an infinity source and infinity destination signal. The destination B input on bus 202 is also supplied on bus 292 to NOR gate 294. The output of NOR gate 294 is supplied on lines 296 and 298, respectively, to flipflops 300 and 302. The outputs of flipflops 300 and 302 are respectively supplied on lines 304 and 306 as a O source (OS) and a O destination (OD) signal.

The destination inputs on bus 202 are supplied on bus 308 from sign register 310, from the exponent OS signal outputted on line 304 to bus 312, or on bus 314. The inputs to bus 314 are the exponent OS signal from line 304, supplied to bus 316 and multiplexed with an output on bus 318 from exponent register file 150. The output of exponent register file 150 on bus 318 is also supplied on bus 320 and multiplexed with a second output from register file 150 supplied on bus 322 to produce another input to bus 314. Exponent register file 150 contains 8 bit registers 324 through 342.

The output of exponent ALU 78 on bus 210 is further supplied on bus 344 as one input to exponent register 230 on bus 346, sign register 310 on bus 348 and exponent register file 150 on bus 350. The input on bus 344 is multiplexed with the output of shifter 162 on bus 352 to determine the input to buses 346, 348 and 350.

The SIGN FILE and SIGN RESULT signals are supplied on lines 354 and 356 and multiplexed to provide an input on line 358 to flipflop 360. The output of flipflop 360 on line 362 is a working sign signal.

The ouput of mantissa ALU on bus 212 is also supplied on bus 364 to 32 bit NOR gate 366. The ouput of NOR gate 366 is respectively supplied on lines 368, 370, 372 and 374 to flipflops 376, 378, 380 and 382. The respective outputs of the flipflops 376-382 on lines 384, 386, 388 and 390 constitute the mantissa O source (OS), O destination (OD), infinity source and infinity destination signals. The output of mantissa ALU 70 is also supplied on bus 392 to a divide/normalize/square root PLA 394. The output of PLA 394 is supplied on bus 396 as one input to bus 244. Mantissa ALU 70 also provides a carry signal on line 398 to flipflop 400. The output of flipflop 400 is supplied on line 402 as a mantissa carry signal.

The source A input on bus 204 is obtained from multiplexed signals on buses 404, 406, 408 and 410. The signals on bus 404 are supplied by mantissa register file 168. The mantissa register file 168 consists of 32 bit registers 412 through 430. The inputs to mantissa file register 168 are supplied on bus 432 from shifter 162. The input signals on bus 406 are supplied by a rounding and constant PLA 434. The input signals on bus 408 are supplied by a 32 bit scratch pad temporary register 436. The input to register 436 is supplied by shifter 162 on bus 438. The input signals on bus 410 are supplied by a second scratch pad temporary register 440. The input to register 440 is supplied by shifter 162 on bus 442.

The destination B input to mantissa ALU 70 on bus 208 is obtained from multiplexed input signals on buses 444, 446, 448 and 450. The input signals on bus 444 are supplied by the first scratch pad temporary register 436. The input signals on bus 446 are supplied by the second scratch pad temporary register 440. Not a number (NAN) signals are supplied as inputs on bus 448. The input signals on bus 450 are supplied by a third scratch pad temporary register 452. The input to register 452 is supplied by shifter 162 on bus 454.

Second scratch pad temporary register 440 also supplies information bus output signals on bus 456. The output of register 440 is also supplied in a feedback loop to shifter 162 on bus 458, and as an input on bus 460 to multiplication PLA 462. The output of multiplication PLA 462 is supplied on bus 464 as a multiplexed input to bus 244. The remaining multiplexed input to bus 244 is nanocode supplied on bus 466.

Additional inputs to the shifter 162 are supplied by bus 468, which receives the multiplexed 0 to 1 FEED signals on buses 470 and 472. These same two feed signals are supplied on buses 474 and 476 for multiplexing with the output of exponent ALU on bus 210 and the information bus input signals on bus 478. The resulting signal is supplied on bus 480 to shifter 162. The output of mantissa ALU 70 on bus 212 is mutliplexed with the output of second scratch pad temporary register 440 on bus 458, with the result being supplied on bus 482 to shifter 162. The 0 and 1 FEED signals are also supplied on buses 484 and 486. The multiplexed output of these buses is supplied on bus 488 to shifter 162.

A nanoop input signal is supplied on bus 490, and a PLA op signal is supplied on bus 492. The multiplexed result is supplied on bus 494 as an input to mantissa ALU 70.

Details of the control path 146 (FIG. 2) are shown in FIGS. 4A, 4B, 4C and 4D. In the following description, certain commercially available integrated circuits will be specified. It should be recognized that the microprocessor of this invention, when embodied in integrated circuit form, will include circuits that perform equivalent circuit functions to those performed by the commercially available integrated circuit parts identified below. Unless otherwise specified, further information on the integrated circuits identified by part number is available in the publication entitled "TTL Data Book", published in 1978 by Fairchild Camera and Instrument Corporation, Mountain View, California 94042, of record in the first four related applications identified at the beginning of this application, the disclosure of which publication is incorporated by reference herein to supplement the following description.

The output of control ALU 100 is supplied on bus 112 to control registers 110. The control registers 110 include a sequential register (PC) 500 for microcode, a data point (DP) register 502 for accessing constants in external memory and also to extend on chip temporary memory, stack registers 504 and 506 for handling microsubroutines and ARH and ARL registers 508 and 510 for defining addresses in main memory. The registers 508 and 510 are included here because the control ALU 100 controls the incrementing of these registers.

The registers 500-510 are connected to bus 112 by buses 512-522, respectively. Buses 520 and 522 are connected to bus 112 through buffer amplifier 524. A control signal for the buffer amplifier 524 is supplied from the most significant bit of the N2 output register. A control register 530, implemented with 74273 and 7474 type integrated circuits 540, 542 and 550, 552, 554, 562, respectively,is connected to supply outputs on bus 532 to external information bus 62. Additional control signals are supplied to the external information bus 62 from the control register 530 through bus 534 and buffer amplifier 536. The buffer amplifier is connected to receive a RD CTRL signal on line 538. Integrated circuit 540 in control register 530 receives a $\overline{RP}$ signal on line 543 and a $\overline{XLCTRL}$ signal through inverter amplifier 544 and line 546. Integrated circuit 542 receives a +5 V DC reference signal on line 548. Integrated circuits 550, 552 and 554 each receive a RESET* signal, respectively, on lines 556, 558 and 560. Integratd circuit 562 receives a $\overline{RESET12}$ signal on line 564. External information bus 62 is connected to the buses 520 and 522 through buffer amplifier 566. A control bit from the N2 output register is supplied on line 562 as a control signal to the buffer amplifier 566. TRegisters 500-510 of the control register file 110 provide their outputs to bus 570, respectively, through buses 572-582 and buffer amplifiers 584-590. Additional inputs to the bus 570 are provided from microcode ROMs 571 and 573 via bus 575. Register 577 controls long jumps for double word operation and provides another input to bus 570 through bus 579 and buffer amplifier 581. Line 583 from bus 570 provides control inputs to the microprogram RAMs 571 and 573. The RAMs 571 and 573 are grounded at 585. A SM1:JMP signal is supplied to microjump register 577 on line 587. An INT MICRO RAM and LD:JMP signal are provided on lines 589 and 592, respectively, as inputs to AND gate 594. The output of AND gate 594 forms another control input to microjump register 577 on line 596. An additional input to the bus 570 is provided by bus 598 from internal information bus 56 through buffer amplifier 600. Bus 570 also supplies signals to internal information bus 56 through bhus 598 and buffer amplifier 602. An $\overline{SMI:IB}$ control signal is supplied to buffer amplifier 600 on line 604. Similarly a $\overline{SIB:M1}$ control signal for buffer amplifier 602 is supplied on line 606. External information bus 62 communicates bidirectionally with internal information bus 56 through buffer amplifiers 608 and 610. Buffer amplifier 608 receives an $\overline{SIBX:IB}$* control signal on line 612. Buffer amplifier 610 recieves an $\overline{SIB:IBX}$* control signal on line 614.

A 12 bit address input to external random access memory (RAM) 616 is provided from bus 570 by bus 618 through memory driver amplifier circuit 620 which is grounded at 622. Data inputs and outputs are received and supplied from and to the external RAM 616 by bus 624, which communicates bidirectionally with internal information bus 56 through buffer amplifiers 626 and 628. The buffer amplifier 626 receives a $\overline{S2B:LB}$ control signal on line 630. Buffer amplifier 628 receives an $\overline{SLB:IB}$* control signal on line 632. Bus 624 communicates with bus 634 through buffer amplifier 636. Line 638 supplies a control signal from bus 570 to the buffer amplifier 636 through inverting amplifier 640. Bus 634 also supplies inputs to microjump register 577 on bus 642. Microcode RAMs 571 and 573 also supply inputs to bus 634 through bus 644 and buffer amplifier 646.

Buffer amplifier 646 receives an uninverted control signal from line 638 on line 648.

Short jump register 650 is connected to bus 634 by bus 652. The short jump register is for single word jumps. The short jump register 650 also supplies C0-C4 signals to source bus 654 of control ALU 100, explained in more detail below. Short jump register 650 receives a control input on line 656 which is connected to the output of AND gate 658. One input to AND gate 658 is supplied by the Q output of flipflop 660 on line 662. A second input to AND gate 658 is a CLR1 signal on line 664. Flipflop 660 receives an input signal on line 666 from AND gate 668. The inputs to AND gate 668 are a TERM 1 signal on line 670, a TERM 2 signal on line 672 and an $\overline{FRZ}$ signal on line 674. Additional outputs from short jump register 650 are supplied on line 676 to lines 678, 680 and 682 as multiplexed inputs to bus 654 through buffer amplifiers 686, 688 and 690. An SEL control signal is supplied to amplifier 686 on line 692. The output of NAND gate 694 is supplied to amplifier 688 on line 696. The three inputs to NAND gate 694 are the FJMP, SEL and output of inverting amplifier 698 on lines 700, 702 and 704, respectively. The input to amplifier 698 is supplied on line 706 from the output of OR gate 708. The inputs to OR gate 708 are a BR+1 and BRH signals on lines 710 and 712, respectively. The output of OR gate 708 is also supplied on line 714 as one input to NAND gate 716. The other input to NAND gate 716 is the SEL signal on line 718. The output of NAND gate 716 is supplied on line 720 as the control input to buffer amplifier 690. Amplifier 722 is connected to ground at 724 and receives a CSRC control signal on line 726. When other inputs are not being supplied to bus 654, it is held at +5 V.

Most of the control signals discussed above are generated by a control ALU PLA 730. Each of the output signals generated by PLA 730 is indicated at its respective terminal. A $\overline{CY}$ control signal is supplied to control ALU 100 on line 732. A CCYFF signal is supplied on line 734 to the $\overline{Q}$ terminal of D flipflop 736. A CLK 1 signal is supplied to flipflop 736 on line 738. The CACYIN signal is supplied on line 740 as a control to the ALU 100.

Mapper 102 is connected to bus 570 by bus 104. Mapper 102 includes an instruction register decode ROM 750 and three 74S244 type octal buffer/line driver integrated circuits 752, 754 and 756. The IR decode ROM 750 and the buffer/line driver 754 are connected between bus 104 and bus 108. Control signals are supplied to IR decode ROM 750 and buffer/line driver 752 by AND gate 760 on lines 762 and 764. One input to AND gate 760 is the SM1:IR signal on line 768. The other input to AND gate 760 is supplied on line 770 by AND gate 772. One input to AND gate 772 is supplied on line 774 by inverting amplifier 776. Inverting amplifier 776 is connected to bus 108 by line 778. The other input to AND gate 772 is supplied on line 780 by inverting amplifier 782, also connected to bus 108 by line 784. An IRSELB control signal is supplied to IR decode ROM 750 on line 786 by AND gate 788. One input to AND gate 788 is the SM1:IR signal on line 790. The other input to AND gate 788 is supplied by the output of inverting amplifier 792 on line 794. The input to amplifier 792 is suppled by AND gate 772 on line 795.

IRMUX1 and IRMUX2 control signals are supplied to buffer/line driver 754 respectively on lines 796 and 798 by AND gates 800 and 802. One input to AND gate 800 and both inputs to AND gate 802 are connected to bus 108. The other input to AND gate 800 is supplied by inverting amlpifier 782 on line 804. The IRSELB control signal is also supplied to buffer/line driver 754 and to buffer/line driver 756 on lines 806 and 808. Buffer/line driver 756 is connected to bus 180 by lines 808 and 810.

Instruction register 106 is connected to mapper 102 through bus 108. The instruction register 106 is formed from two 74S273 type 8 bit register integrated circuits 812 and 814. The register circuits 812 and 814 are connected to external information bus 62 by bus 60. An $\overline{XLIR}$ control signal is supplied to registers 812 and 814 on lines 816 and 818. An instruction temporary scratch pad register 820 is connected to bus 108 by lines 821. An SDT register 822 is connected to bus 634 by bus 824. An address decoding file 826 is connected to the IR temporary scratch pad register 820 and the SDT register 822 by lines 828 and 830. The IR temporary register 820 is also connected to SDT register 822 by lines 832. The SDT register redefines fields for more complicated instructions to be carried out in the mircoprocessor of this invention. The IR temporary scratch pad register 820 and a portion 834 of the SDT register 822 are implemented with 74S273 type 8 bit register integrated circuits. The SDT register 822 also includes a 74S257 type two input multiplxer integrated circuit 836. The file address decoder 826 includes a 74S253 type 4 input multiplexer integrated circuit 838, a PLA 840 connected to the multiplexer 838 by lines 842 and a plurality of logic gates 844.

A NEW control signal is applied to scratch pad register 820 on line 846. Control signals for the SDT register 822 are supplied on lines 848, 850, 852, 856, 858, 860 and 862. The input to control lines 848, 850 and 852 is supplied by AND gate 864. The two inputs to AND gate 864 are the CLK1 and LD:SDT signals on lines 866 and 868. The input to control line 856 is supplied by AND gate 870. The two inputs to AND gate 870 are a CK4 signal on line 872, and the output of OR gate 874 on line 876. The two inputs to OR gate 874 are the LD:SDT signal on line 878 and the output of AND gate 880 on line 882. The two inputs to AND gate 880 are an M3-0 signal on line 884 and LD:JMP signal on line 886. The input to control line 858 is supplied by AND gate 890. The two inputs to AND gate 890 are supplied by AND gate 892 on line 894 and by NAND gate 896 on line 898. The two inputs to AND gate 892 are the $\overline{RP}$ signal on line 900 and the output of inverting amplifier 902 on line 904. The input to inverting amplifier 902 is a NEW PULSE signal on line 906. The two inputs to NAND gate 896 are a CK4 signal on line 908 and an SM1:STK signal on line 910. The inputs to control lines 860 and 862 are supplied by AND gate 892. Control inputs for the file address decoder 826 are supplied on lines 912, 914, 916, 918 and 920. The input to control line 912 is $a\mu R/\overline{IR}$ signal. The input to control line 914 is a $\overline{SD}$ signal. The input to control line 916 is supplied by OR gate 922. One input to OR gate 922 is supplied by AND gate 924 on line 926. The other input to OR gate 922 is supplied by AND gate 928 on line 930. One input to AND gate 924 is supplied by a LMF: signal on line 932. The other input to AND gate 924 is supplied by OR gate 934 on line 936. The two inputs to OR gate 934 are an MOVD signal on line 938 and an MOVDE signal on line 940. The two inputs to AND gate 928 are a T*0 signal on line 942 and the output of OR gate 944 on line 946. The two inputs to OR gate 944 are the output of inverting amplifier 948 on line 950 and an $\overline{MOVS}$ signal on line 952. The input to inverting amplifier 948 is the LMF: signal on line 954. The input to control line 918 is supplied by the output of OR gate 956. The two inputs to OR gate 956 are supplied by the BR: signal on line 958 and by the output of AND gate 960 on line 962. The two inputs to AND gate 960 are supplied by a BR* signal on line 964 and an Q1 signal on line 966.

Details of the nanocode 1 ram 128 in control path 146 (FIG. 2) including associated decode circuits are shown in FIGS. 5A, 5B, 5C and 5D. The RAM 128 includes RAM integrated circuits 1000-1012. Bus 130 is connected to the RAMs 1000-1012 through input register 1014 and lines 1016-1028. Control signals to the input register 1014 are supplied on lines 1030 and 1032. The input to line 1030 is provided by AND gate 1034. One input to AND gate 1034 is the $\overline{RP}$ signal on line 1036. The other input to AND gate 1034 is provided on line 1038 by NAND gate 1040. One input to NAND gate 1040 is provided by an INN2-1 signal on line 1042. A second input to NAND gate 1040 is provided on line 1044 by inverter amplifier 1046. The input to inverter amplifier 1046 is the INN2-2 signal on line 1048. A third input to NAND gate 1040 is provided on line 1050 by inverting amplifier 1052. The input to inverting amplifier 1052 is the INN2-3 signal on line 1054. The remaining input to NAND gate 1040 is provided on line 1056 by the output of AND gate 1058, which also provides the second control input for input register 1014 on line 1032. The inputs to AND gate 1058 are a CK3, TRM1 and a TRM2 signal on lines 1060, 1062 and 1064.

The RAMs 1000-1012 are respectively connected to pipeline registers 1070-1082 by lines 1084-1096. Pipeline register 1082 provides offset feedback signals to the RAMs 1000-1012 on lines 1098-1110 respectively. A control signal for pipeline register 1070 is provided on line 1112 by AND gate 1114. The two inputs to AND gate 1114 are the CLK1 signal on line 116 and the $\overline{FRZ^*}$ signal on line 1118. Outputs from the pipeline register 1070 include an H/L signal on line 1120, inputs to 74139 type 1-OF-4 decoder integrated circuit 1122 on line 1124, inputs to 74259 type 8 bit addressable latch integrated circuit 1126 on line 1128, a CIC: signal on line 1130 and an MCB: signal on line 1132. The outputs of decoder 1122 are an $\overline{M1A:O}$ signal on line 1134, an $\overline{M1A:SH}$ signal on line 1136, an $\overline{M1A:CON}$ signal on line 1138 and an M1A:F1 signal on line 1140, supplied through inverting amplifier 1142.

Outputs from the addressable latch 1126 include the M1B: signal on line 1144, the M1B:SH signal on line 1146, the M1B:SL signal on line 1148 supplied through inverter amplifier 1150, the M1B:MD signal supplied on line 1152 through inverter amplifier 1154, the M1B:CON NAN signal on line 1156 supplied through inverter amplifier 1158 and the M1B:SH E3 signal supplied on line 1160 as one input to NOR gate 1162. The other input to NOR gate 1162 is the M1B: SH signal. The output of NOR gate 1162 is the M1B SH signal on line 1164.

Outputs from the pipeline register 1072 include the MCI: signal on line 1166, the SFE:0 signal on line 1168, the SFE1 signal on line 1170, the SFE:2 signal on line 1172, one input to AND gate 1174 on line 1176, the SLALU signal on line 1178, the BR: signal on line 1180, and one of three outputs on line 1182. The other input to AND gate 1174 is the $\overline{INHE}$ signal on line 1184. The output of AND gate 1174 is the LSGF signal on line 1186.

The other two inputs for line 1182 are provided by pipeline register 1074 on line 1188. The three signals supplied on line 1182 are an SCS-0, SCS-1 and SCS-2 signal. Inputs from pipeline register 1074 are supplied to 74373 type integrated circuit 1190 on lines 1192. A CLK2 signal is supplied to latch 1190 on line 1194.

One output from the latch 1190 is provided on line 1196 to AND gate 1198. The other input to AND gate 1198 is the $\overline{INHM}$ signal on line 1200. The output of AND gate 1198 is an LSH: signal on line 1202. A second output from latch 1190 is supplied on line 1204 as one input to AND gate 1206. The other input to AND gate 1206 is the $\overline{INHM}$ signal on line 1208. The output of AND gate 1206 is the LFL: signal on line 1210. The third output from latch 1190 is supplied on line 1212 as one input to AND gate 1214. The second input to AND gate 1214 is the $\overline{INHM}$ signal on line 1216. The output of AND gate 1214 is the LMD: signal on line 1218. One input to AND gate 1220 is provided on line 1222 by pipeline register 1074. The other input to AND gate 1220 is the $\overline{INHM}$ signal on line 1224. The output of AND gate 1220 is the LMF: signal on line 1226. A fourth output from latch 1190 is supplied on line 1228 to AND gate 1230. The second input to AND gate 1230 is the $\overline{INHM}$ signal on line 1232. The output of AND gate 1230 is the LCF: signal on line 1234. Two outputs from latch 1190 are supplied on line 1236 to 74139 type decoder circuit 1238. The INHM bar signal is supplied as a control signal through inverter amplifier 1240 on line 1242 to the decoder 1238. Outputs from the decoder 1238 include the $\overline{NOLOAD}$ signal on line 1244, the LIZF signal supplied through inverter amplifier 1246 on line 1248, the LIZFCOND: signal supplied through inverter amplifier 1250 on line 1252 and the LSZFSL: signal supplied through inverter amplifier 1254 on line 1257. Lines 1248 and 1252 provided inputs to OR gate 1256. The output of OR gate 1256 forms one input to AND gate 1258 on line 1260 and to AND gate 1262 on line 1264. The other input to AND gate 1258 is the SDS* signal on line 1266. The output of AND gate 1258 is the LIZD signal on line 1268. The other input to AND gate 1262 is the $\overline{SDS^*}$ signal on line 1270. The output of AND gate 1262 is the LIZS signal on line 1272.

One output from pipeline register 1076 is supplied to latch 1190 on line 1274. Three outputs from pipeline register 1076 are supplied on line 1276 to the exponent constant PLA 234 (FIG. 3A). Two of these signals are also supplied through inverting amplifiers 1278 and 1280 on lines 1282 and 1284 to AND gate 1286. The output of AND gate 1286 is the $\overline{E1A:PA}$ signal on line 1288, which is supplied as one input to NAND gate 1290. The third signal on line 1276 is also applied on line 1292 as an additional input to NAND gate 1290. The output of NAND gate 1290 is an $\overline{E1A:E}$ signal on line 1294. Two outputs from pipeline register 1076 are supplied on line 1296 to 74139 type decoder integrated circuit 1298. The outputs of decoder circuit 1298 are an E1BO signal on line 1300, E1B:S signal on line 1302, an E1B: F1 signal supplied on line 1304 through inverter amplifier 1306 and a CC93 signal supplied on line 1308. Additional outputs from the pipeline register 1076 are the ECA: signal on line 1310 and the $\overline{EC1}$: signal supplied on line 1312 through inverter amplifier 1314.

Three outputs from pipeline register 1078 are supplied to 74373 type latch integrated circuit 1315 on lines 1316. A CLK2 signal is also supplied to the latch 1315 on line 1318. The outputs from latch 1315 are supplied on line 1320 to 74139 type decoder 1322. The $\overline{\text{INHE}}$ signal is also supplied through inverter amplifier 1324 to the decoder 1322 on line 1326. Outputs from the decoder 1322 include a NOLOAD signal on line 1328, an LDE signal supplied through inverter amplifier 1330 on line 1332, an LDS signal supplied through inverter amplifier 1334 on line 1336 and an LDEF1 signal supplied through inverter amplifier 1338 on line 1340. A third output from latch 1315 is supplied on line 1342 as one input to AND gate 1344. The other input to AND gate 1344 is the $\overline{\text{INHE}}$ signal supplied on line 1346. The output of AND gate 1344 is the LECF:. signal on line 1348. The SGSNL-0 and SGNSL-1 signals are supplied as outputs from pipeline register 1078 on lines 1350. Another output from pipeline register 1078 is supplied on line 1352 to latch circuit 1354. An output from circuit 1354 on line 1356 forms one input to AND gate 1358. The other input to AND gate 1358 is the $\overline{\text{INHE}}$ on line 1360. The output of AND gate 1358 is supplied on line 1360 as one input to AND gate 1362. The other input of AND gate 1362 is supplied from circuit 1354 on line 1364. The output of AND gate 1362 is an LDX signal on line 1366. The output of AND gate 1358 is also supplied on line 1368 as one input to AND gate 1370. The other input to AND gate 1370 is supplied by inverter amplifier 1372 on line 1374. The input to inverter amplifier 1372 is the output from circuit 1354 on line 1364. The output of inverter amplifier 1372 is also supplied on line 1375 as SDS* signals. The output of AND gate 1370 is the LSX signal on line 1376. An additional output from pipeline register 1078 is supplied on line 1378 as one input to OR gate 1380. The other input to OR gate 1380 is supplied by the output of AND gate 1382. One input to AND gate 1382 is supplied by the pipeline register 1078 on line 1384. The other input of AND gate 1382 is the EFCY signal on line 1386. The output of OR gate 1380 is supplied on line 1388 to AND gate 1390. The other input to AND gate 1390 is a $\overline{00}$ signal on line 1392. The output of AND gate 1390 forms one input to OR gate 1394 on line 1396. The other input to OR gate 1394 is the Q2 signal on line 1398. The output of OR gate 1394 is the BR* signal on line 1400, which is supplied as one input to OR gate 1402. The other input to OR gate 1402 is supplied by the output of AND gate 1406 on line 1408. The Q1 signal on line 1410 and the Q2 signal on line 1412 form the inputs to AND gate 1406. The output of OR gate 1402 on line 1414 is supplied to the circuit 1354.

Four outputs from pipeline register 1080 are supplied on lines 1416, 1418, 1420 and 1422 through inverter amplifier 1424, 1426 and 1428 to 74273 type 8 bit register integrated circuit 1430, 74LS138 type decoder/demultiplexer integrated circuit 1432, inhibit circuit 1434 and inhibit circuit 1436. A control signal to register 1430 is provided on line 1438 by AND gate 1440. One input to AND gate 1440 is provided on line 1442 from 1416. The CLK2 signal is provided as a second input to AND gate 1440 on line 1444. The third input to AND gate 1440 is supplied by the output of OR gate 1446 on line 1448. One input to OR gate 1446 is provided by AND gate 1450 on line 1452. One input to AND gate 1450 is supplied by the output of inverting amplifier 1454 on line 1456. The fourth output from pipeline register 1080 supplied to line 1416 is also supplied as the input to inverting amplifier 1454. The second input to AND gate 1450 is provided by inverter amplifier 1458 on line 1460. The input to inverting amplifier 1458 is provided by the third output of pipeline register 1080 supplied to line 1416, supplied to line 1462 as well. The third input to AND gate 1450 is provided by the second output of pipeline register 1080 for line 1416, supplied on line 1464 as well. That second output is also supplied on line 1466 through inverter amplifier 1468 as the second input to OR gate 1446 on line 1470. Two outputs of pipeline register 1080 are supplied on lines 1472 to latch 1315. Latch 1315 is connected to 74139 type decoder 1474 by lines 1476. A control input to decoder 1474 is supplied by AND gate 1478 on line 1480. One input to AND gate 1478 is supplied by an $\overline{\text{INHM}}$ signal on line 1482. The other input to AND gate 1478 is supplied by the CLK1 signal on line 1484. Outputs from the decoder 1474 include the NOCLR signal on line 1486, the CLRSH signal on line 1488, the CLRSL signal on line 1490 and the CLRSLOP signal on line 1492. The remaining output from pipeline register 1080 is the LGTH: signal on line 1494.

Four outputs from register 1430 are supplied on line 1496 to 74342 type 4-to-10 decode circuit 1498. Outputs from the circuit 1498 include the RNI signal on line 1500 supplied through inverter 1502, the ADD signal on line 1504 supplied through inverter amplifier 1506, the SUB signal on line 1508 supplied through buffer amplifier 1510, the MULT signal supplied on line 1512 through inverter amplifier 1514, the DIV signal supplied on line 1516 through inverter amplifier 1518, the SQT signal supplied on line 1520 through inverter amplifier 1522, the MOVS signal supplied on line 1524 through inverter amplifier 1526, the MOVD signal supplied on line 1528 through inverter amplifier 1530, the $\overline{\text{MOVI}}$ signal on line 1532, and the MOVDE signal supplied on line 1534 through inverter amplifier 1536. The ADD and SUB signals on lines 1504 and 1508 are supplied as inputs to OR gate 1540. The output of OR gate 1540 on line 1542 is the ADD V SUB signal. The MULT and DIV signals on lines 1512 and 1516 are supplied as inputs to OR gate 1544. The output of OR gate 1544 on line 1546 is the MULT V DIV signal. The SQT signal on line 1520 and the RMI signal on line 1500 are supplied as inputs to OR gate 1548. The output of OR gate 1548 on line 1550 is the RNI V SQT signal. The MOVS and MOVD signals on lines 1524 and 1528 are supplied as inputs to OR gate 1552. The output of OR gate 1552 on line 1554 is the MOVS V MOVD signal.

Further inputs to the decoder/demultiplexer circuit 1432 include the LDOP signal on line 1556 and the CLK4 signal on line 1558. Outputs of the decoder/demultiplexer 1432 are the SET IX, SET NNV, SET OV, SET ZDIV, SETW IVAL and SET ILL signals on lines 1560–1570, respectively.

Additional input to the inhibit circuit 1434 are the MF-S, MF-SI, MF-Z, EF-CY, EF-SZ, MB-SUM (O), MF-CY, T*O and T*1 signals on lines 1572-1588, respectively. The outputs from inhibit circuit 1434 are the INHAM signal on line 1590 and INHAE signal on line 1592. Outputs from the inhibit circuit 1436 are the INHBM signal on line 1594 and the INHBE signals on line 1596. Lines 1590 and 1594 provide inputs to OR gate 1598. The output of OR gate 1598 on line 1600 provides one input to NOR gate 1602. Lines 1592 and 1596 provide inputs to OR gate 1604. The output of OR gate 1604 on line 1606 is one input to NOR gate 1608. The other inputs to NOR gates 1602 and 1608 are provided by OR gate 1610 on line 1612. One input to OR gate 1610 is provided by flipflop 1613 on line 1614. The output of flipflop 1613 is the INH BRCH signal, also supplied on line 1616 to branch PLAs, discussed below. The CLK1 signal is supplied on line 1618 to flipflop 1613. The input to flipflop 1613 is supplied by AND gate 1620 on line 1622. The inputs to AND gate 1620 are the PRMI, TRM2, and output signal from AND gate 1624, respectively supplied on lines 1626, 1628 and 1630. One input to AND gate 1624 is supplied by OR gate 1632 on line 1634. The inputs to OR gate 1632 are the DRCH and BR+1 signals on line 1635 and 1636, respectively. The other input to AND gate 1624 is supplied by OR gate 1638 on line 1640. The four inputs to OR gate 1638 are the M30-4 signals supplied on lines 1642–1648.

The other input to OR gate 1610 is supplied by OR gate 1650 on line 1652. One input to OR gate 1650 is the D1HFRZ signal on line 1654. The other input to OR gate 1650 is supplied on line 1656 by flipflop 1658. The input to flipflop 1658 is supplied on line 1660 by AND gate 1662. The inputs to AND gate 1662 are the T1 signal on line 1664, the T2 signal inverted by amplifier 1666 on line 1668 and the $\overline{FRZ}$ signal on line 1670.

The outputs of NOR gates 1602 and 1608 are supplied on lines 1672 and 1674 to 74373 type latch circuit 1676. The latch 1676 receives the CLD3 signal on line 1678. The outputs of latch 1676 are the $\overline{INHM}$ signal on line 1680 and the $\overline{INHE}$ signal on line 1682.

Six outputs from pipeline register 1082 are connected to branch circuits 1690–1702 by lines 1704–1716. The last five of these outputs are also supplied on bus 1718 to amplifier 1720. An SCS-2 signal on line 1722 is supplied through inverter amplifier 1724 as a control signal to amplifier 1720. The SCS-2 signal is also supplied as a control signal to amplifier 1726, which has its input grounded at 1728. The outputs of amplifier 1720 and 1726 are multiplexed at 1730. The offset signals supplied to lines 1098-1110 by pipeline register 1082 are also supplied on lines 1732 as inputs to NAND gate 1734. The output of NAND gate 1734 provides one input to OR gate 1736 on line 1738. The other input to OR gate 1736 is the INH BRCH signal on line 1740. The output of OR gate 1736 is the TRM 1 signal one line 1742.

Additional inputs to the branch circuits 1690–1702 are provided by OR gate 1744 on lines 1746-1758. The INH BRCH signal on line 1760, supplied by line 1616, provides one input to OR gate 1744. The other input to OR gate 1744 is supplied by AND gate 1762 on line 1764. The inputs to AND gate 1762 are the SCS-2 signal on line 1766 and the inverted PLA SEL supplied through inverter amplifier 1768 to line 1770. Outputs from the branch PLAs 1690-1698 are provided on lines 1772-1780. Outputs from the branch PLA 1700 are provided on lines 1782-1790. Outputs from the branch PLA 1702 are provided on lines 1792-1800. Outputs on lines 1782 and 1792 are supplied as inputs is the BRCH signal. The outputs and 1792 are supplied as inputs or OR gate 1802. The output on lines 1784 and 1794 are supplied to OR gate 1806. The output of OR gate 1806 on line 1808 is the BR+1 signal. The outputs on lines 1786 and 1796 are supplied to OR gate 1810. The output of OR gate 1810 on line 1812 is the COM0 signal. The outputs on lines 1788 and 1998 are supplied to OR gate 1814. The outputs of OR gate 1814 on line 1816 is the COM1 signal. The outputs on lines 1790 and 1800 are supplied to NOR gate 1818. The output of NOR gate 1818 is the $\overline{FRZ}$ signal on line 1820. The $\overline{FRZ}$ signal is inverted by amplifier 1822 and supplied as one input to NOR gate 1824. The other input to NOR gate 1824 is supplied by OR gate 1826 on line 1828. One input to OR gate 1826 is the INHFRZ signal on line 1830. The other input to OR gate 1826 on line 1832 is the T1.T2.FRZ signal. The output of NOR gate 1824 on line 1834 is supplied to flipflop 1836. The CLK3 signal is also supplied to flipflop 1836 on line 1838. The output of flipflop 1836 on line 1840 is the FR2* signal.

FIG. 1 shows details of the nanocode 2 PLA 132. Bits 0-4 and 13-15 of M3 bus 1899 connected to a 74LS273 type 8 bit input register 1900. Lines 1902, 1906 and 1908 connect the input register 1900 to nanocode 2 PLA circuits 1910, 1912 and 1914. Bits 0-4 of the bus 1899 are also supplied as inputs to NOR gate 1916. The output of NOR gate 1916 is supplied on line 1918 inverter amplifier 1920 to the nanocode 2 PLAs 1910-1914 on lines 1922, 1924 and 1926. The STX empty B V B+1, IR status, 16/32 ADDR SELECT and TERM 1 signals are also supplied as control inputs to each of the PLAs 1910-1914 on lines 1928, 1930 and 1932, respectively. As shown, the PLAs 1910, 1612 and 1914 are arranged with the least significant bit of the nanocode at the right of the PLA 1914 and the most significant bit of the nanocode at the left of PLA 1910.

The PLAs 1910, 1912 and 1914 are respectively connected to 74S273 type 8 bit, output registers 1934, 1936 and 1938 by lines 1940, 1942 and 1944. Additionally, PLA 1914 is connected by lines 1946 to a 7474 type D positive edge triggered flipflop circuit 1948. The flipflop 1948 receives the CLK1 signal on line 1950. The TCLK signal is supplied on line 1952 through inverter amplifier 1954 to the flipflop 1948 as well. The outputs of flipflop 1948 are supplied on line 1956 and lines 1958-1962 as inputs to the PLAs 1910, 1912 and 1914 respectively.

The +5V and CLK1 signals are supplied to output registers 1934, 1936 and 1938 on lines 1964. The $\overline{RP}$ signal is supplied to output register 1938 on line 1966.

Three outputs from output register 1934 are connected to a 74S259 type addressable latch circuit 1968 by lines 1970. The +5VDC potential is supplied to the latch 1968 on line 1972, and ground inputs are supplied at 1974. Outputs from the latch 1968 are the SM1:PC signal supplied through inverting amplifier 1976 on line 1678, the SM1:DP signal supplied through inverting amplifier 1980 on line 1982, the SM1:ARL signal supplied through inverting amplifier 1984 on line 1986, the SM1:ARH signal, supplied through inverting amplifier 1988 on line 1990, the SM1:STK and SM1:IR signals, supplied respectively on lines 1992 and 1994, the SM1:JMP signal supplied through inverting amplified 1996 on line 1998, and the SM1:IB bar signal supplied through inverting amplifier 2000 on line 2002. The MEM:0, MEM:1 and $\overline{RW}$ signal are respectively provided by output register 1934 on lines 2004, 2006 and 2008. The remaining two outputs from output register 1934 are supplied on lines 2010 to a 74S139 type 1-of-4 decoder circuit 2012. Two inputs to the decoder 2012 are groued at 2014. The outputs of decoder 2012 are the SIB:M1 signal supplied through inverter amplifier 2016 on line 2018, the $\overline{SIB:IB}$ signal supplied on line 2020, the SIB:IBX signal supplied through inverter amplifier 2022 on line 2024, and the SIB:SL signal supplied through inverter amplifier 2026 on line 2028.

The first two outputs from output register 1936 are not utilized. The CALU:0, CALU1 and CALU2 signals are respectively supplied on lines 2030, 2032 and 2034. The remaining three outputs from output register 1936 and the first two outputs of outputs register 1938 are connected as inputs to a 74S373 type octal transparent latch circuit 2036 by lines 2038 and 2040, respectively. Ground and CLK2 signal inputs are provided to the latch circuit 2036 at lines 2042 and 2044. The first two outputs of latch circuit 2036 are supplied on lines 2046 to a 74S259 type addressable latch circuit 2048. Additionally, the first output from latch 2036 is supplied to the address register input multiplexer on line 2049. The +5 VDC potential is applied to latch 2048 on line 2050. Inputs at 2052 are grounded. The first output from latch 2048 on line 2054 is supplied as one input to AND gate 2056. The second input to AND gate 2056 is supplied by flipflop 2058 on line 2060. The CLK3 signal is supplied to flipflop 2058 on line 2062. The input to flipflop 2058 is supplied by NAND gate 2064 on line 2066. One input to NAND gate 2064 is the TERM 2 signal on line 2068. The other input to NAND gate 2064 is supplied by NAND gate 2070 on line 2072. The two inputs to NAND gate 2070 are the TERM 1 and $\overline{FRZ}$ signals on lines 2074 and 2076. The remaining utilized outputs from the latch 2036 are the LD:JMP, LD:STK and LD:SDT signals on lines 2078, 2080 and 2082. The remaining output signals from output register 1938 are the INH FRZ, SLB:IB, BUSY and TERM:2 signals on lines 2084, 2086, 2088 and 2090, respectively.

Figure 8:
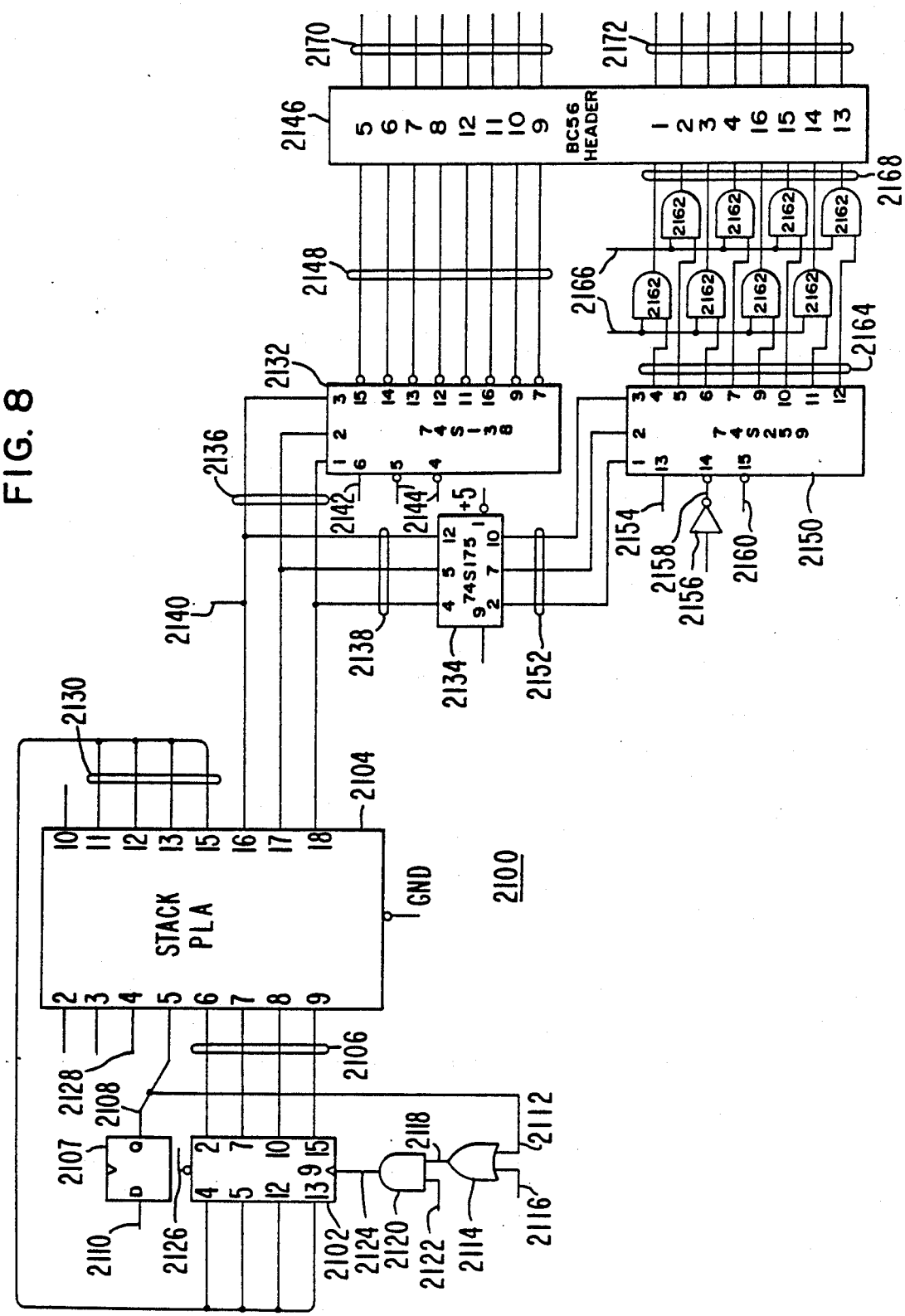
FIG. 8 is a block diagram depicting stack logic which controls the sequencing mechanism in the microcode during operation of the microprocessor.

Stack logic 2100 is shown in FIG. 8. Stack counter 2102 is connected to stack PLA 2104 by lines 2106. Flipflop 2107 is connected to PLA 2104 by line 2108. The input to flipflop 2107 is the SM1:STK signal on line 2110. The output of flipflop 2107 is also supplied on line 2112 as one input to OR gate 2114. The other input to OR gate 2114 is the LD:STK signal on line 2116. The output of OR gate 2114 on line 2118 is supplied as one input to AND gate 2120. The other input to AND gate 2120 is supplied by the CLK 1 signal on line 2122. The output of AND gate 2120 is supplied to stack counter 2102 on line 2124. The $\overline{RP}$ signal is supplied to counter 2102 on line 2126. The LD:STK signal is also supplied to PLA 2104 on line 2128. The TOP 0, TOP 1, TOP 2, and TOP 3 outputs from PLA 2104 are supplied on lines 2130 as inputs to the counter 2102. The A0, A1 and A2 (least significant bits) outputs from PLA 2104 are supplied to a 74S138 decoder/demultiplexer circuit 2132 and a 74S175 type flipflop circuit 2134 on lines 2136 and 2138, respectively. The A0 signal is also supplied to stack OE Logic on line 2140. The decoder/demultiplexer circuit 2132 receives the +5V DC potential on line 2142 and ground on lines 2144. The outputs of decoder/demultiplexer 2132 are connected to circuit 2146 by lines 2148. The outputs of flipflop 2134 are connected to 74S259 type addressable latch circuit 2150 by lines 2152. Additional inputs to the addressable latch are the +5 VDC potential on line 2154, the LD:STK signal, supplied through inverting amplifier 2156 on line 2158 and ground at line 2160. The outputs of addressable latch 2150 are each connected to one of AND gates 2162 by lines 2164. The other input to AND gates 2162 is the CLK 1 signal on lines 2166. The outputs of AND gates 2162 connected to the circuit 2156 by lines 2168. The outputs of circuit 2146 are the STK 1OE through STK 8OE signals ones lines 2170 and the STK 1CK through STK 8CK signals on lines 2172. The stack logic 2100 controls the sequencing mechanism in the microcode during operation of the microprocessor.

Figure 9:
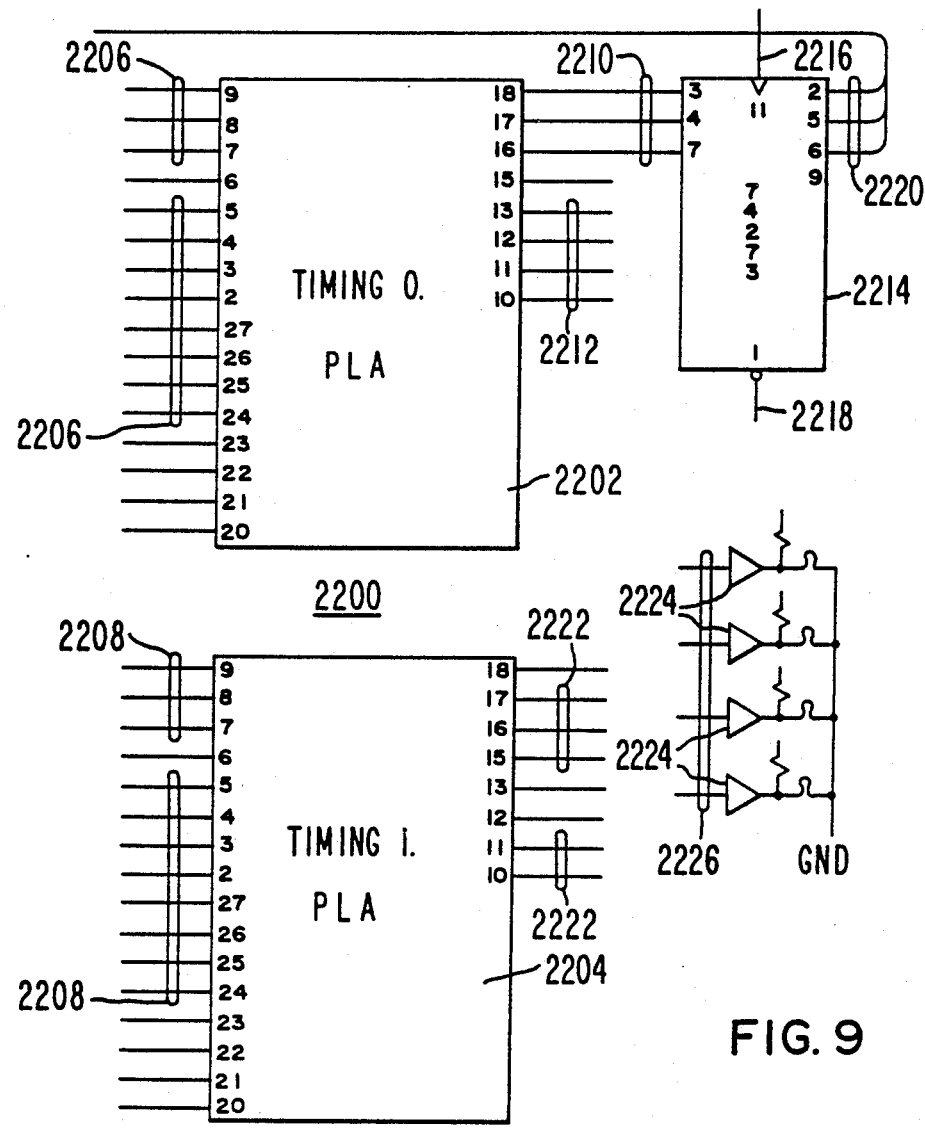
FIG. 9 is a block diagram depicting the details of timing circuits in a control, timing and interface section of the floating point microprocessor integrated circuit shown in FIG. 1.

FIG. 9 shows details of timing circuits in the control, timing and interface section 52 (FIG. 1) of the microprocessor. Timing circuits 2200 include first and second timing PLAs 2202 and 2204. The C0*, C1*, C2* LGTH, MENA, MEMB, BUS ACK, MR, $\overline{WR}$, PRIN and RDY signals are supplied as inputs to the PLAs 2202 and 2204 on lines 2206 and 2208, respectively. Outputs from the timing PLA 2202 are the C0, C1 AND C2 signals on lines 2210 and the CLK 1, CLK 2, CLK 3, and CLK 4 signals on lines 2212. The C0-C2 signals on line 2210 form inputs to 74273 type 8 bit register circuit 2214. A 20 MHZ clocking frequency on line 2216 and +5 V DC potential on line 2218 form additional inputs to the register 2214. The outputs of the register 2214 are the C0*, C1* and C2* signals on lines 2220. The outputs of timing PLA 2204 are the WS, TD, TA, STRBD and STRBA signals on lines 2222.

The timing circuits 2200 also include amplifiers 2224, each of which is supplied with one of the CK1 through CK4 signals on lines 2226 for wave shaping purposes.

Figure 10:
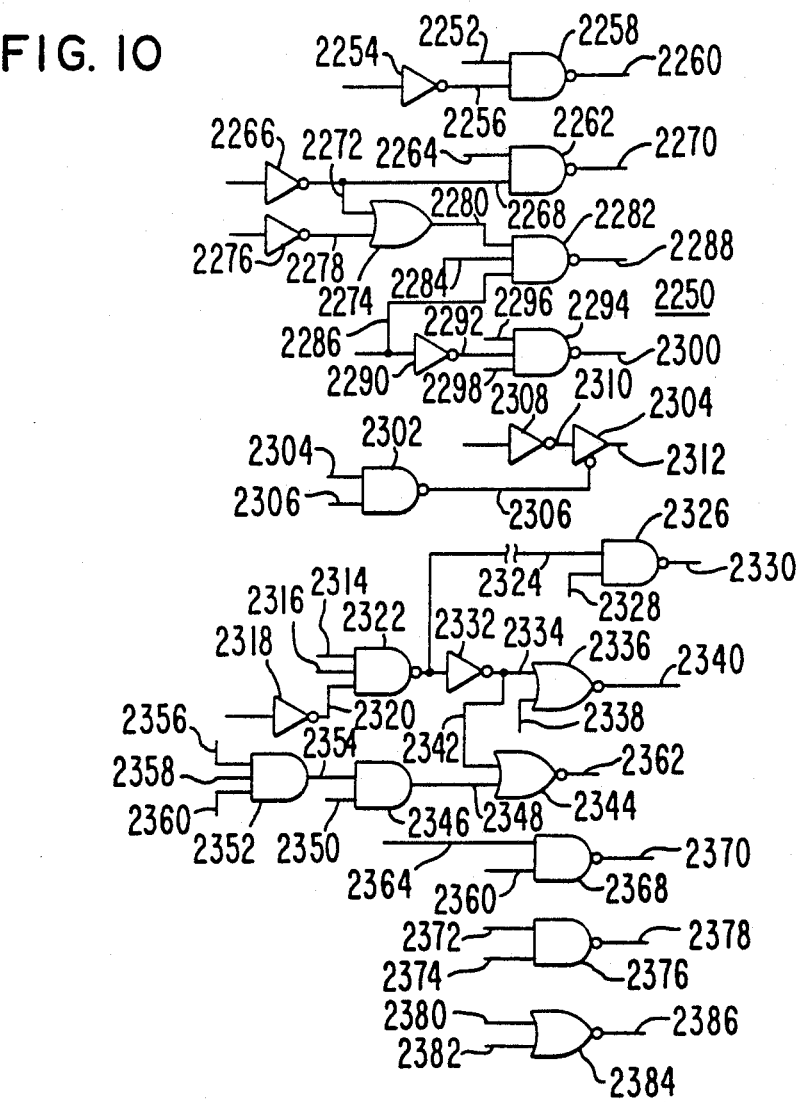
FIG. 10 is a logic diagram depicting timing and control circuits in the control, timing and interface section of the floating point microprocessor integrated circuit shown in FIG. 1.

FIG. 10 shows miscellaneous timing and control circuit 2250 in the control timing and interface section 52 (FIG. 1) of the microprocessor. The STRBA and $\overline{SM1:ARL}$ signals are supplied on line 2252 and through inverting amplifier 2254 on line 2256 to NAND gate 2258. The output of NAND gate 2258 is the $\overline{STRBA\ 1}$ signal on line 2260. The STRBA signal is supplied as one input to NAND gate 2262 on line 2264. The $\overline{SM1:ARH}$ signal is supplied through inverter amplifier 2266 as the other input to NAND gate 2262 on line 2268. The output of NAND gate 2262 is the $\overline{STRBA2}$ signal on line 2270. The inverted $\overline{SM1:ARH}$ signal on line 2272 as one input to OR gate 2274. The other input to OR gate 2274 is the 16/2 signal supplied through inverter amplifier 2276 on line 2278. The output of OR gate 2274 on line 2280 forms one input to NAND gate 2282. The FTRBD signal forms a second input to NAND gate 2282 on line 2284. The $\overline{SM1:OP}$ signal forms a third input to NAND gate 2282 on line 2286. The output of NAND gate 2282 is the STRBDMA signal on line 2288.

The $\overline{SM1:DP}$ signal is also supplied through inverting amplifier 2290 on line 2292 as one input to NAND gate 2294. The second input to NAND gate 2294 is the WS signal on line 2296. The third input to NAND gate 2294 is the W/$\overline{R}$ signal on line 2298. The output of NAND gate 2294 is a write pulse for local memeory on line 2300.

The M1 and M0 signals are supplied as inputs to NAND gate 2302 on lines 2304 and 2306. The output of NAND gate 2302 is a control signal for amplifier 2304 on line 2306. The W/$\overline{R}$ signal is supplied inverting amplifier 2308 on line 2310 as the input to amplifier 2304. The output of amplifier 2304 on line 2312 is the W/$\overline{R}$ signal.

The M0, M1 and T0 signals are supplied on lines 2314, 2316 and through inverting amplifier 2318 on line 2320 as inputs to NAND gate 2322. The output of NAND gate 2322 is supplied on line 2324 as one input to NAND gate 2326. The other input to NAND gate 2326 is the SIB:FL signal on line 2328. The output of NAND gate 2326 is the $\overline{SIB:SL^*}$ signal on line 2330. The output of NAND gate 2322 is also supplied through inverter amplifier 2332 on line 2334 as one input to NOR gate 2336. The other input to NOR gate 2336 is the SIB:M1 signal on line 2338. The output of NOR gate 2336 is the $\overline{SIB:M1^*}$ signal on line 2340. The inverter output of NAND gate 2322 on line 2334 is also supplied on line 2342 as one input to NOR gate 2344. The other input to NOR gate 2344 is supplied by AND gate 2346 on line 2346. The T0 signal is supplied as one input to AND gate 2346 on line 2350. The other input to AND gate 2346 is the output of AND gate 2352 on line 2354. The three inputs to AND gate 2352 are the M0, M1 and W/R signals on lines 2356, 2358 and 2360, respectively. The output of NOR gate 2344 is the $\overline{SIBX:IB^*}$ signal on line 2362. The SIB:IBX and T0 signals are respectively supplied on lines 2364 and 2366 as inputs to NAND gate 2368. The output of NAND gate 2368 is the $\overline{SIB:IBX^*}$ signal on line 2370. The BLK:IB and T0 signals are supplied as inputs on lines 2372 and 2374, resepectively, to NAND gate 2376. The output of NAND gate 2376 is the $\overline{SLB:IB^*}$ signal, which interrupts the information bus too the local bus, on line 2378. The M1 and PRIN signals are respectively supplied on lines 2380 and 2382 to NOR gate 2384. The output of NOR gate 2384 is the $\overline{BUS\ REQUEST}$ signal on line 2386.

Figure 11:
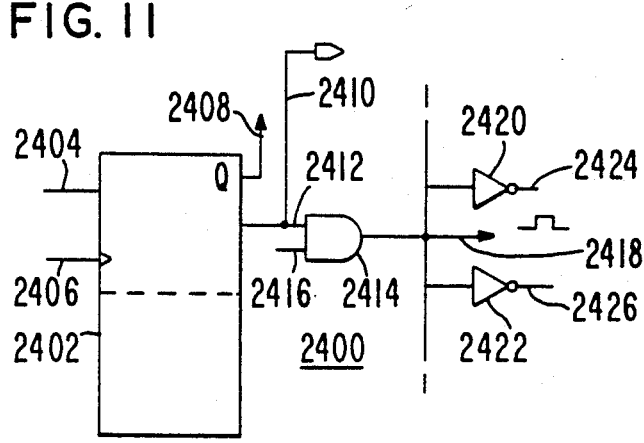
FIG. 11 is a block diagram depicting reset logic circuits in the control, timing and interface section of the floating point microprocessor integrated circuit shown in FIG. 1.

FIG. 11 shows reset logic circuits 2400 in the control timing and interface section 52 (FIG. 1) of the microprocessor. Reset flipflop circuit 2402 receives the $\overline{MR}$ signal and the CK3 signal as inputs on lines 2404 and 2406, respectively. The Q output of the flipflop 2402 is the $\overline{RESET}$ signal on line 2408. The $\overline{Q}$ output of the flipflop 2402 is the reset signal on line 2410. The RESET signal is also supplied on line 2412 as one input to AND gate 2414. The other input to AND gate 2414 is the CK1 signal on line 2416. The output of AND gate 2414 is the RP signal on line 2418. The RP signal is also supplied through inverting amplifiers 2420 and 2422 on lines 2424 and 2426, respectively, as the $\overline{RP}$ signal.

Figure 12B:
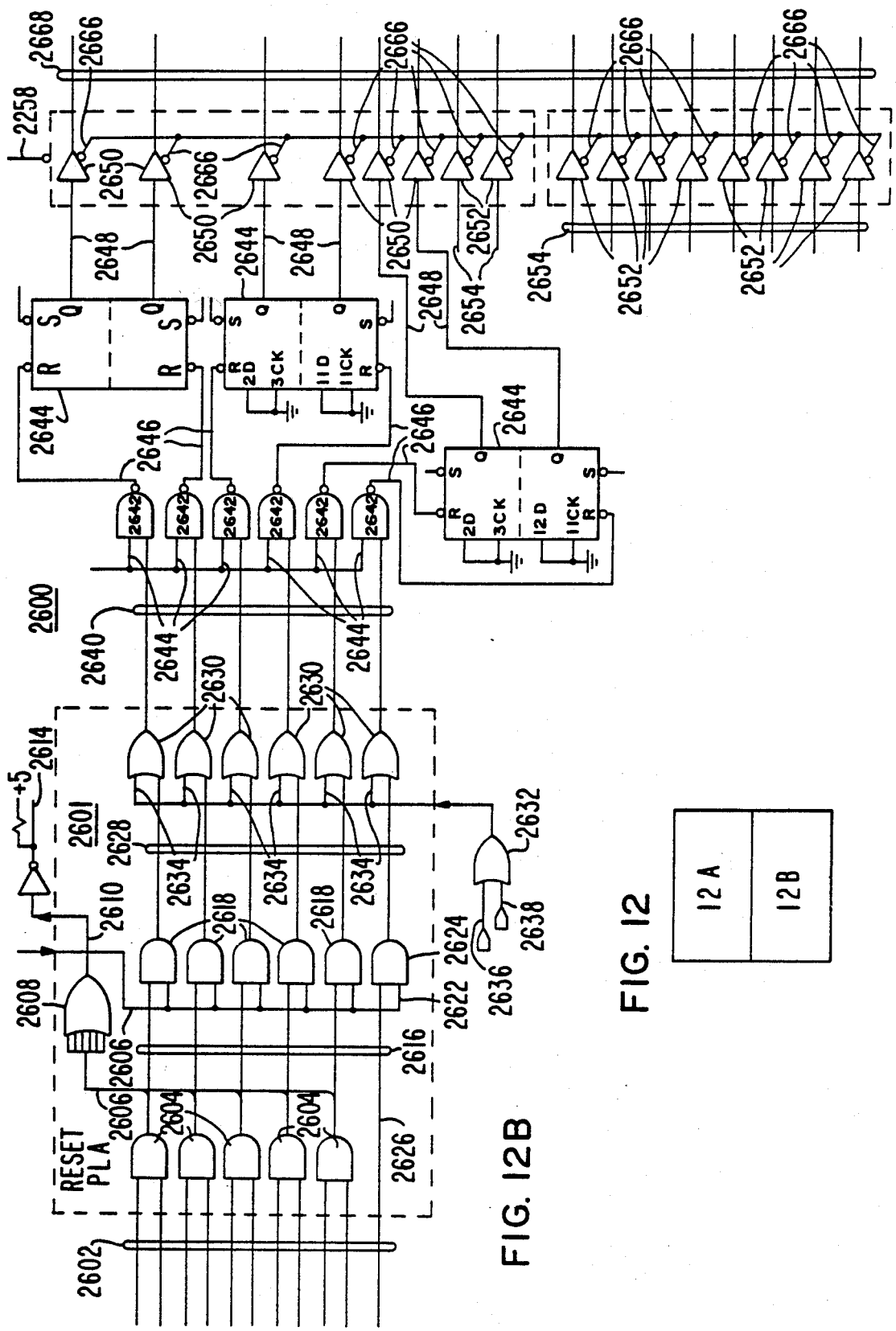
FIGS. 12A and 12B, keyed together as shown in FIG. 12, is a more detailed block diagram of circuits for synchronization of a host microprocessor and the microprocessor of the present invention when utilized together in a system.
Figure 12:
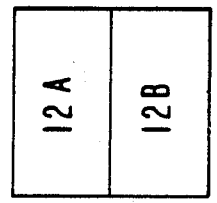
Figure 12A:
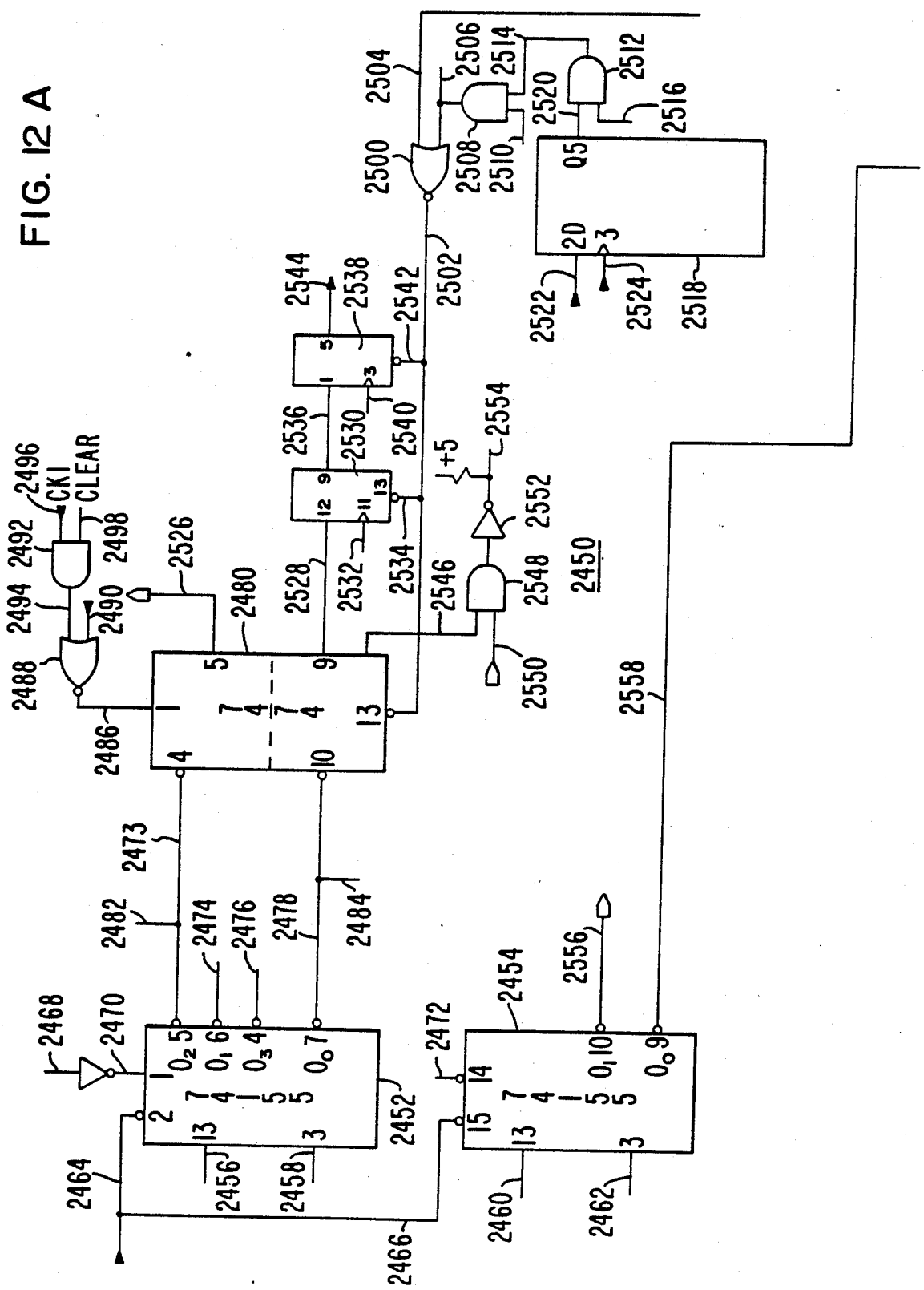

FIG. 12A shows details of circuits 2450 for synchronization of a host microprocessor 2451 (FIG. 16) and the microprocessor 50 of this invention when utilized together in a system. The circuits 2450 are also contained within control timing and interface section 52 (FIG. 1) of the microprocessor. 74155 type 1-of-4 decoder/demultiplexer circuits 2452 and 2454 receive the EXIBL 0 and EXIBL 1 signals as inputs on lines 2456, 2458, 2460 and 2462. Both circuits 2452 and 2454 also recieve the $\overline{CE}$ signal on lines 2464 and 2466, respectively. Decoder/demultiplexer 2452 also receives the $\overline{W}$ through inverting amplifier 2468 on line 2470. The circuit 2454 receives the W signal on line 2472. The outputs of the decoder/multiplexer circuit 2452 are the $\overline{XLARL}$, $\overline{XLCTRL}$, $\overline{XLARH}$, and $\overline{XLIR}$ signals on lines 2473, 2474, 2476 and 2478, respectively. Lines 2473 and 2478 form inputs to 7474 type dual D position edge triggered flipflop circuit 2480. The output on line 2473 is also supplied on line 2482 to the ARL register. The output on line 2476 is supplied to the ARH register. The output on line 2478 is also supplied on line 2484 to the instruction register. The R input to flipflop 2480 is provided on line 2486 by the output of NOR gate 2488. One input to NOR gate 2488 is supplied by the RP signal on line 2490. The other input to NOR gate 2488 is supplied by AND gate 2492 on line 2494. The two inputs to AND gate 2492 are the CK1 signal on line 2496 and the CLEAR signal on line 2498. The R- input to flipflop 2480 is supplied by the output of NOR gate 2500 on line 2502. One input to NOR gate 2500 is the RP signal on line 2504. The other input to NOR gate 2500 is, alternatively, the NEW signal on line 2506 or the output of AND gate 2508. One input to AND gate 2508 is the CK1 signal on line 2510. The other input to AND gate 2508 is the output of AND gate 2512 on line 2514. One input to AND gate 2512 is the $\overline{INH1}$ signal on line 2516. The other input to AND gate 2512 is the Q output of flipflop 2518 on line 2520. The inputs to flipflop 2518 are the SM1:IR and CK2 signals on lines 2522 and 2524, respectively. One Q output from dual flipflop 2480 is the ADD VALID signal on line 2526. A second Q output from dual flipflop 2480 is supplied on line 2528 as one input to flipflop 2530. The other inputs to flipflop 2530 are the CK4 signal on line 2532 and the output of NOR gate 2500 on line 2534. The output of flipflop 2530 is supplied on line 2536 as an input to flipflop 2538. The other inputs to flipflop 2538 are the CK1 signal on line 2540 and the output of NOR gate 2500 on line 2542. The output of flipflop 2538 is the IR STATUS signal on line 2544. A $\overline{Q}$ output from dual flipflop 2480 is supplied on line 2546 as one input to AND gate 2548. The other input to AND gate 2548 is the IR FREE ENABLE signal on line 2550. The output of AND gate 2458 is supplied through inverting amplifier 2552 on line 2554 as the $\overline{INTREQ}$ signal. One output from decoder/demultiplexer circuit 2454 is the $\overline{READ\ CR}$ signal on line 2556. The other output of decoder/demultiplexer 2454 is the $\overline{READ\ STATUS}$ signal on line 2558, supplied to the STATUS REGISTER 2600 in FIG. 12B. The IXE, IX, UNE, UN, OVE, OV, ZDE, ZD, IVE and IV signals are supplied as inputs on lines 2602 to AND gates 2604. The outputs of AND gates 2604 are supplied on lines 2606 to OR gate 2608. The output of OR gate 2608 is supplied on line 2610 to inverting amplifier 2612. The output of inverting amplifier 2612 is the $\overline{INT\ REQ}$ signal on line 2614.

The outputs of AND gates 2604 also each form one input on lines 2616 to AND gates 2618. The other input to AND gates 2618 is the CLI signal on lines 2620. The CLI signal is also supplied on line 2622 as one input to AND gate 2624. The other input to AND gate 2624 is the ILL signal on line 2626. The outputs of AND gates 2618 and 2624 are supplied on lines 2628 as one input to OR gates 2630. The other input to OR gates 2630 is supplied by the output of OR gate 2632 on lines 2634. The inputs to OR gate 2632 are the RESET and CS signals on lines 2636 and 2638, respectively. The outputs of OR gates 2630 are the IRX, RUN, ROV, RZD, RIV and RILL signals, each supplied on one of the lines 2640 as one input to NAND gates 2642. The other input to NAND gates 2642 is the CK1 signal on lines 2644. Pairs of the NAND gates 2642 each supply two RESET signals to one of the dual flipflop circuits 2644 on lines 2646. The outputs from the dual flipflop circuits 2644 are the IX, UNV, OV, ZDIV, IV and ILL signals on lines 2648 to amplifiers 2650. Additionally, amplifiers 2652 each receive one of the ADDR VALID, SPARE, BUSY, EF-DV, MF-S, WFD-FF, EF-DX R STATUS, COM 0, and COM 1 signals on lines 2654. Each of the amplifiers 2650 and 2652 receive the $\overline{READ\ STATUS}$ signal supplied on line 2558 from synchronization circuit 2450 on lines 2666. The Status register output signals from the amplifiers 2650 and 2652 are the IX, UNDERFLOW, OVERFLOW, ZERO DIVIDE, INVALID, ILLEGAL, ADDR, REG, FREE, SPARE ONE, BUSY, EXP=0, MZ, SIGN, EXP-MAX, IR STATUS, CC 0, and CC 1 signals on lines 2668.

Details of the Control register 2700 in the control timing and interface section 52 (FIG. 1) of the microprocessor are shown in FIG. 13. 74273 type 8-bit register circuits 2702 receive the EXI/B signal as inputs on lines 2704. The registers 2702 also receive the $\overline{XLCTRL}$ signal on lines 2706. The upper register 2702 provides the UNE, OVE and IVE signals on lines 2708 to the branch PLA. The other input signals from upper register 2702 are the IXE and ZDE signals. The outputs of the lower register 2702 are the RD 0, RD 1, INF, STD and LA signals, supplied on lines 2710 to amplifiers 2712. The amplifiers 2714 receive the EXI/B signal at inputs on lines 2716.

7474 type flipflop circuits 2718 receive the EXIB 11, EXIB 12, and EXIB 13 signals on lines 2720. The upper dual flipflop circuit 2718 receives the $\overline{\text{RESET}}$ 12 signal on lines 2722 and the lower flipflop circuit 2718 receives the $\overline{\text{RP}}$ signal on line 2724. The flipflops 2718 receives the $\overline{\text{XL}}$ $\overline{\text{CTR1}}$ signal on lines 2726. The flipflops 2718 provide the CS1, CL1 and IR3 ENABLE signals on lines 2728 on amplifiers 2730. The amplifiers 1714, 2712 and 2730 receive the $\overline{\text{READ CR}}$ signal as a control input on lines 2732 and generate their respective amplified input signals on lines 2734.

The CLI1 and CS1 signals are supplied as inputs to OR gate 2736 on lines 2738. The output of OR gate 2736 is supplied on line 2740 to flipflop 2742. The output of flipflop 2742 on line 2744 forms the input to flipflop 2746. The flipflops 2742 and 2746 receive the +5 V DC potential and the CLK 1 signal on lines 2748 and 2750, respectively. The output of flipflop 2746 is supplied on line 2752 as one input to NAND gate 2754. The other input to NAND gate 2754 is the CLK 1 signal on line 2756. The output of NAND gate 2754 is the $\overline{\text{RESET 12}}$ signal on lines 2758. The control register 2700 determines what to do in the case of exceptions during the execution of microinstructions in the microprocessor.

Details of the mantissa ALU (FIG. 3b) of the microprocessor are shown in FIGS. 14A, 14B, 14C and 14D. Since the description of logic gate operation in the mantissa ALU would be repetitive for different data signals, it will be described for a representative data portion only. Input logic circuits 2800 are each connected to one of 9342 type CARRY LOOK AHEAD generator circuits 2802 by lines 2804. The CARRY LOOK AHEAD generator circuits 2802 are each connected to 93459 type CARRY LOOK AHEAD PLA 2806 by lines 2808-2822. The PLA 2806 is connected to output logic gates 2824 by lines 2826-2838. Each of the CARRY LOOK AHEAD generator circuits 2802 is respectively connected to the output logic gates 2824 by lines 2840-2854. Lines 2856-2868 also respectively connected each of the CARRY LOOK AHEAD generator circuits 2802 to the output logic gates 2824. In the case of the right hand CARRY LOOK AHEAD generator circuit 2802 in FIG. 14B, one of the lines 2822 connecting the circuit to the CARRY LOOK AHEAD PLA 2806 is connected to OR gate 2870. The other input to OR gate 2870 is the DC IN signal on line 2854, supplied through inverting amplifier 2872 on line 2874. The output of OR gate 2870 is supplied to PLA 2806 on line 2876.

Figure 14A:
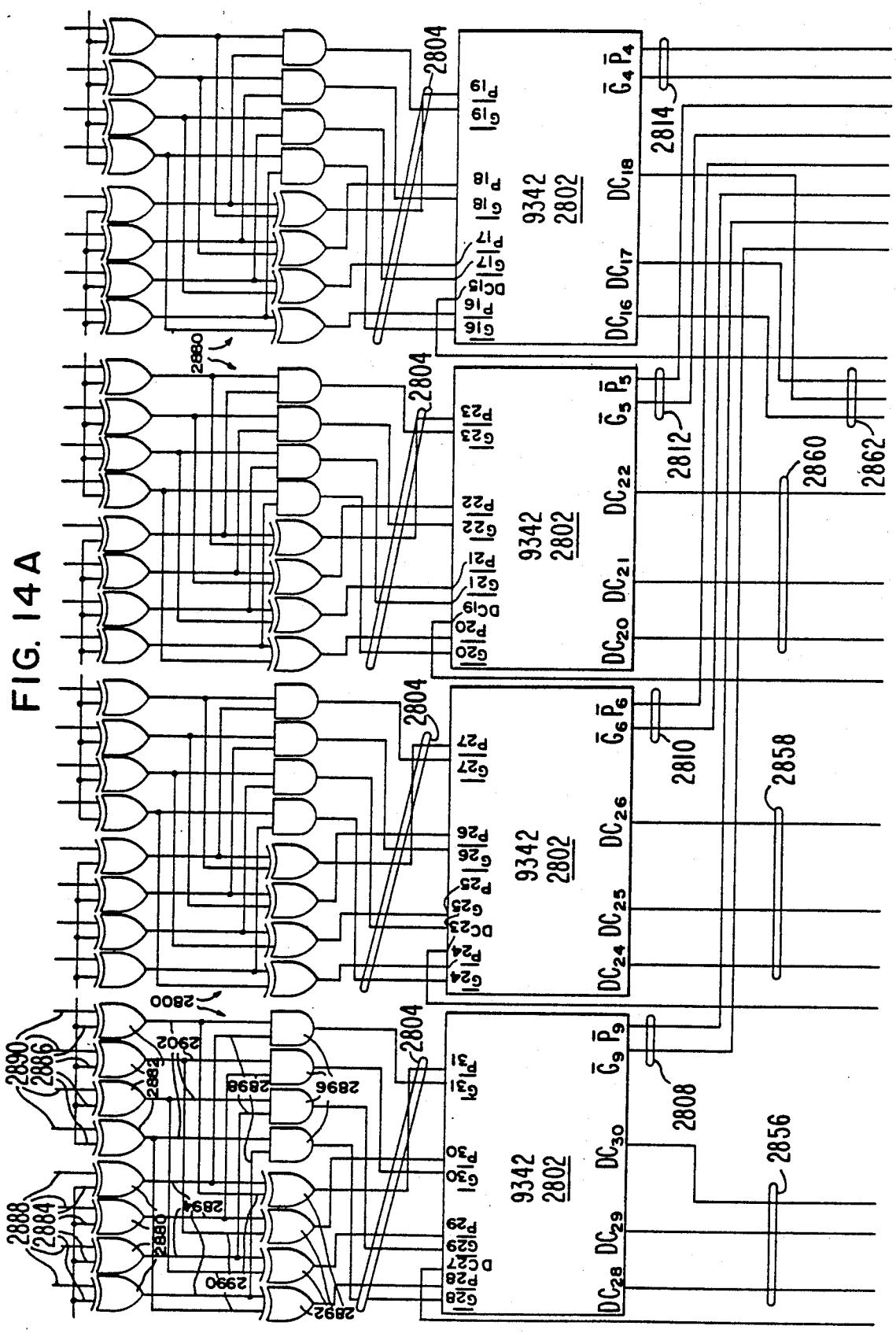
FIGS. 14A, 14B, 14C, and 14D, keyed together as shown in FIG. 4, is a more detailed block diagram of a mantissa arithmetic logic unit portion of the floating point microprocessor integrated circuit shown in FIGS. 1 and 2.
Figure 14B:
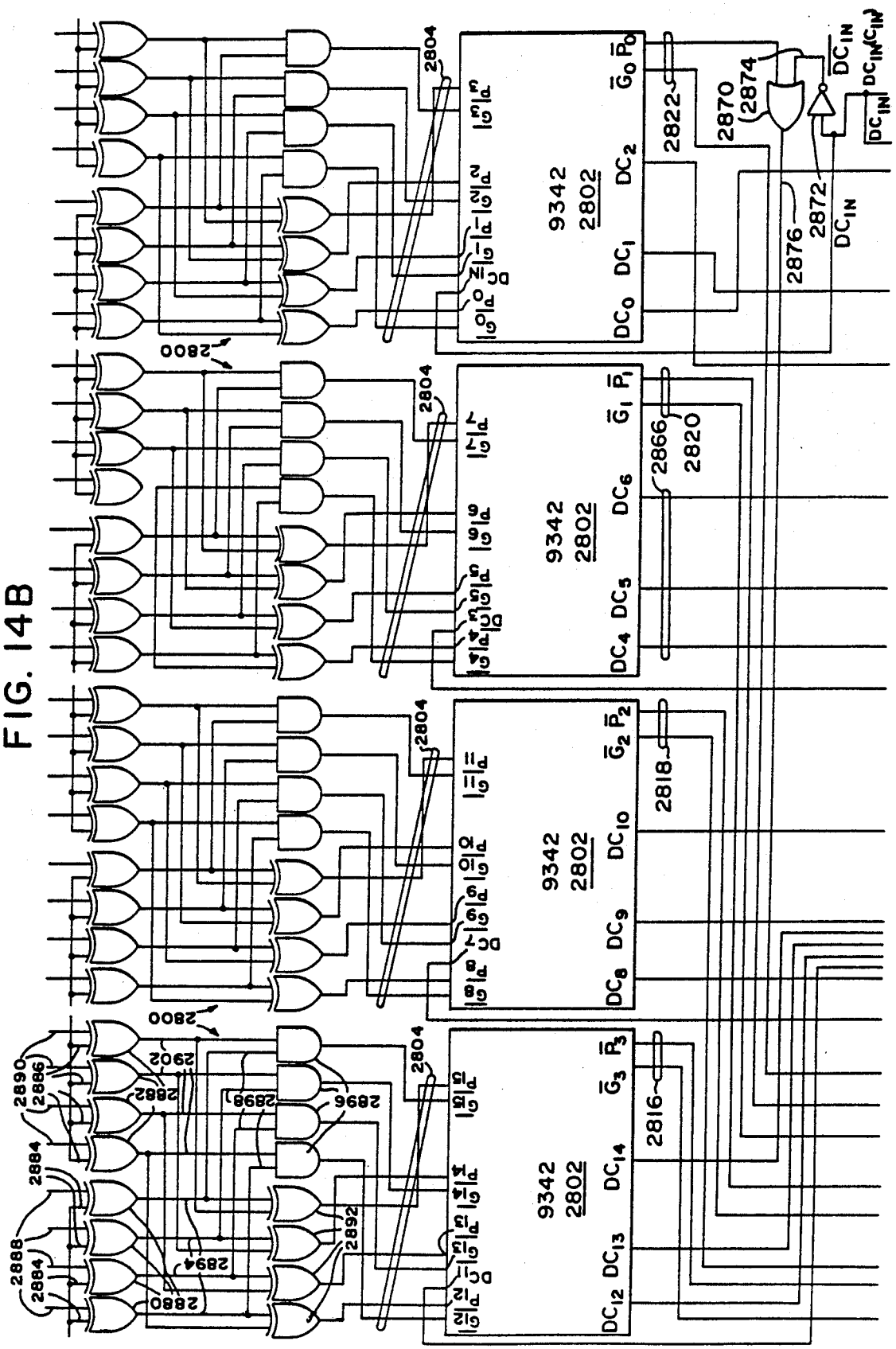
Figure 14C:
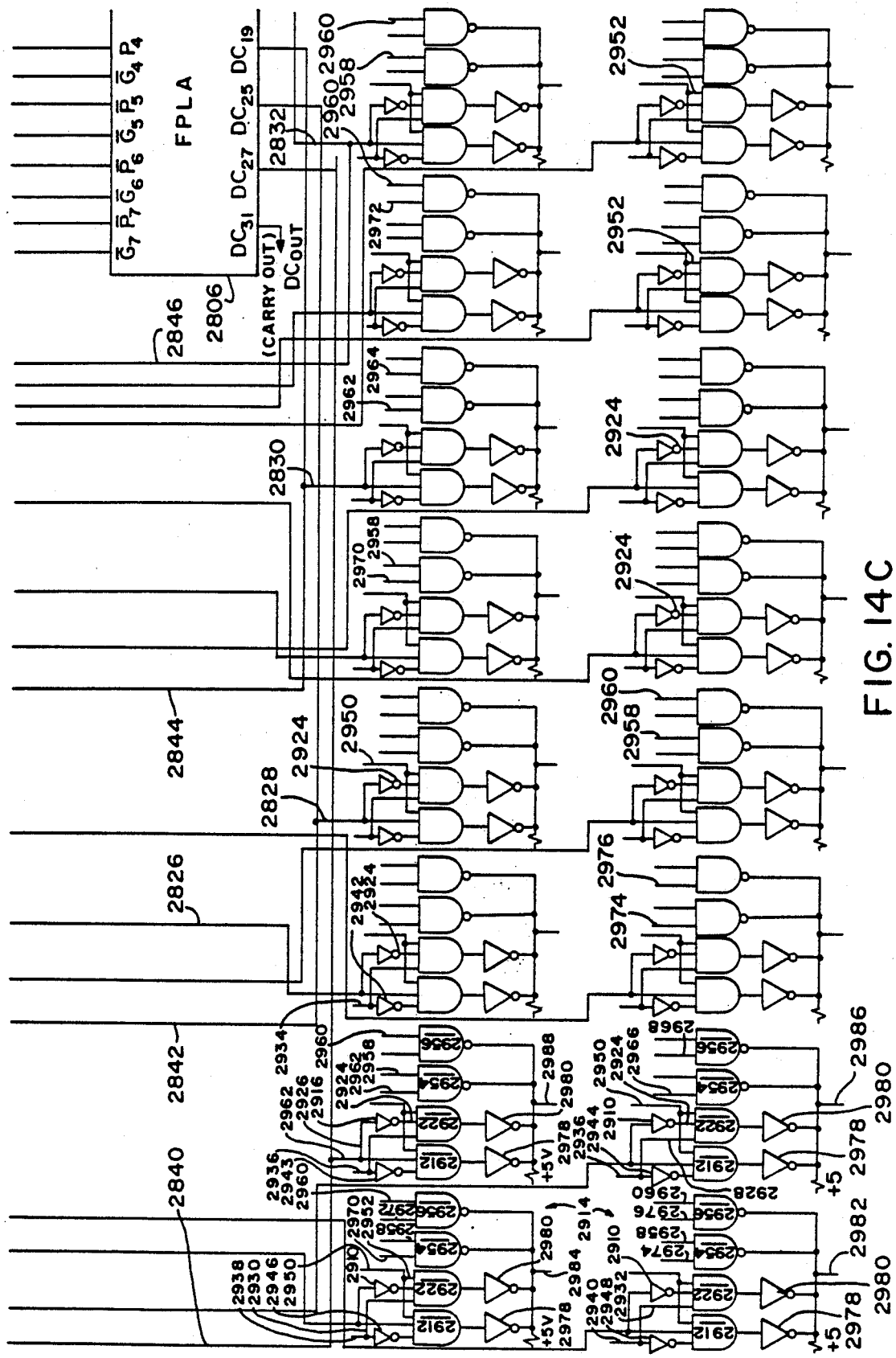
Figure 14D:
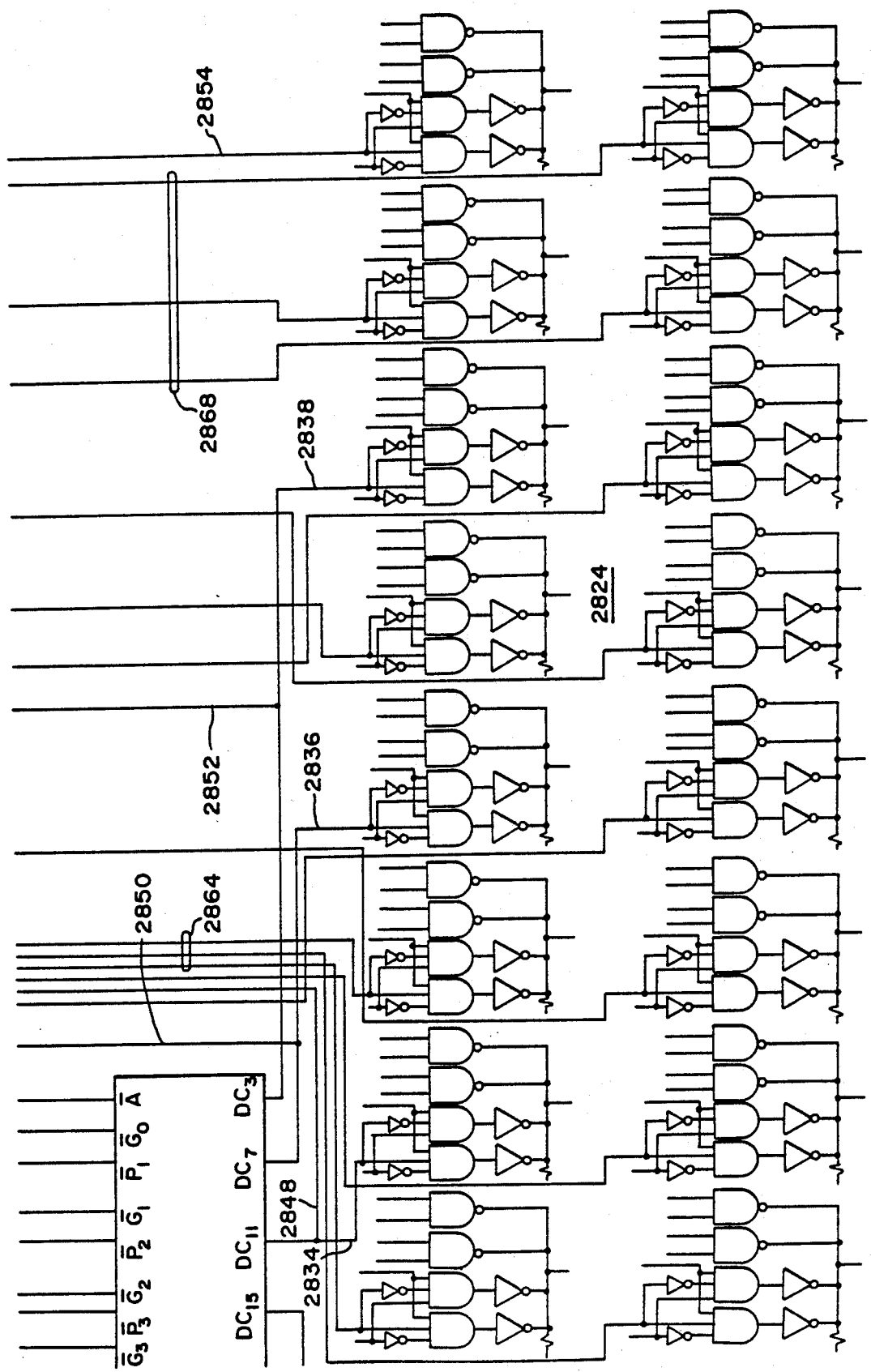

Turning now to a representative example of input logic gate circuits 2800, the leftmost logic gate circuits 2800 in FIG. 14A receive the SUBFDST signals as one input to OR gates 2880 and the SUBFSRC signals as one input to OR gates 2882 on lines 2884 and 2886, respectively. FDST0, FDST1, FDST2, and FDST3 data signals constitute the other inputs to OR gates 2880 on lines 2888. FSRC0, FSRC1, FSRC2 and FSRC3 data signals are supplied as the second inputs to OR gates 2882 on lines 2890. The outputs of OR gates 2880 are supplied as one input to OR gates 2892 on lines 2894 and to AND gates 2896 on lines 2896. Similarly, the outputs of OR gates 2882 are supplied as the other inputs to OR gates 2892 on lines 2900, and the other inputs to AND gates 2896 on lines 2902. The oututs of OR gates 2892 and AND gates 2896 are supplied to the leftmost CARRY LOOK AHEAD generator circuit 2802 in FIG. 14A.

Turning now to the output logic gates 2824. lines 2856 connect outputs from leftmost CARRY LOOK AHEAD generator circuit 2802 to corresponding inverting amplifiers 2910 and AND gates 2912 in subjects 2914 of the output logic gates 2824. Similarly, lines 2840 and 2826 connect another output from CARRY LOOK AHEAD generator circuit 2802 and CARRY LOOK AHEAD PLA 2806 to inverting amplifier 2916 and AND gate 2918 of subset 2920 in output logic gate circuits 2824. The outputs of inverting amplifiers 2910 and 2916 form one input to AND gates 2922 on lines 2924. P28, P29, P30 and P31 signals each form an input to one of the AND gates 2922 on lines 2926, 2928, 2930 and 2932, respectively. The P28-P31 signals are also supplied on lines 2934, 2936, 2938 and 2940, respectively, through inverting amplifiers 2942, 2944, 2946 and 2948 as a second input to the AND gates 2918 and 2912. The A/S control signal is supplied as the third inputs to AND gates 2912, 2918 and 2922 on lines 2950 and 2952. The AOE and AXE control signals respectively form one input to NAND gates 2954 and 2956 on lines 2958 and 2960 in the subsets 2914 and the subset 2920. The G28, P28, G29, P29, G30, P30, G31 and P31 signals provide the other inputs to NAND gates 2954 and 2956 on lines 2962-2976, respectively. The outputs of AND gates 2912 or 2918 and 2922 are supplied through inverting amplifiers 2978 and 2980. The outputs from subsets 2914 and 2920 are the $\overline{\text{SUM 0}}$, $\overline{\text{SUM1}}$, $\overline{\text{SUM2}}$, and $\overline{\text{SUM3}}$ signals on lines 2982, 2984, 2986 and 2988, respectively. The remaining input logic gates 2800 and output logic gates 2824 are connected and operate in conjunction with CARRY LOOK AHEAD generator circuit 2802 and CARRY LOOK AHEAD PLA 2806 in an analogous manner.

Figures 15, 16:
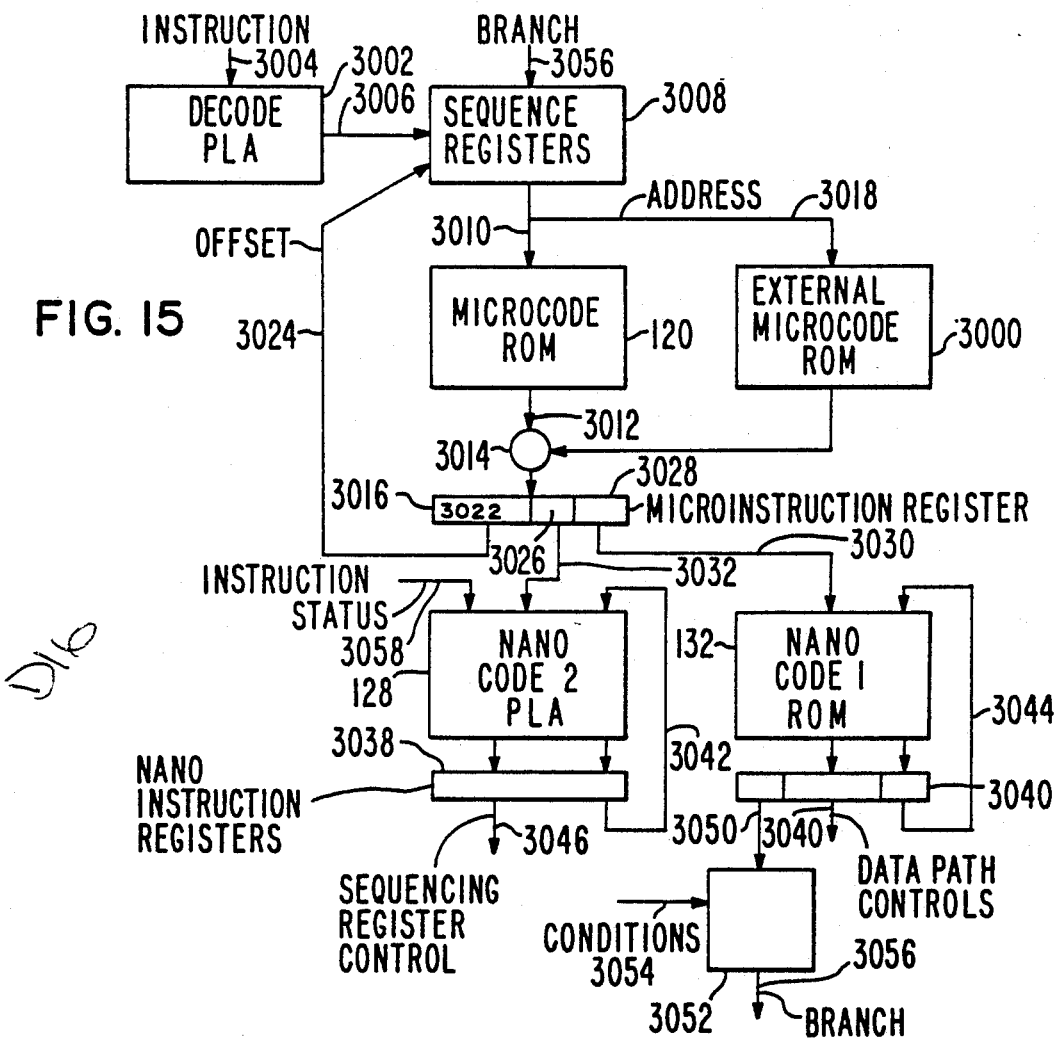
FIG. 15 is a block diagram of another portion of the microprocessor integrated circuit shown in FIGS. 1 and 2 depicting how the microprocessor of the present invention is connected to an external microcode read only memory.
FIG. 16 is a block diagram showing use of the microprocessor of the invention.

FIG. 15 shows how the microprocessor of this invention is connected to an external microcode ROM 3000, in order to allow user supplied microcode to be handled by the microprocessor in the same manner as microcode in the internal ROM 120. Decode PLA 3002 receives instructions on line 3004, decodes those instructions, and provides signals corresponding to the addresses of those instructions on line 3006 to sequence registers 3008. The addresses are supplied by sequence registers 3008 on line 3010 to microcode ROM 120, which outputs the instructions corresponding to the addresses on line 3012 to multiplexer 3014, which in turn supplies the instructions to micro-instruction register 3016. The output of sequence registers 3008 is also connected by line 3018 to the external microcode ROM 3000, located off chip from the microprocessor. External microcode ROM 3000 is also connected to mutliplexer 3014 by line 3020, to supply externally stored micro-instructions to the micro-instruction register 3016. A first portion 3022 of the micro-instruction register 3016 is connected to sequence register 3008 by line 3024. Second and third portions 3026 and 3028 of the micro-instruction register 3016 are respectively connected to nanocode 2 PLA 132 and nanocode 1 ROM 128 by lines 3030 and 3032. The nanocode 2 PLA 132 and the nanocode 1 ROM 128 are respectively connected by lines 3034 and 3036 to nanoinstruction registers 3038 and 3040. Lines 3042 and 3044 provide feedback loops between the nanoinstruction registers 3038 and 3040, respectively, and the nanocode 2 PLA 132 and the nanocode 1 ROM 128. Sequencing register control output signals are supplied by nanoinstruction register 3038 on line 3046. Data path control signals are supplied by nanoinstruction register 3040 on line 3048. Branch inputs are supplied by nanoinstruction register 3040 on line 3050 to branch PLA 3052. Branch condition signals are also supplied on line 3054 to the PLA. Branch control signals are supplied by the branch PLA 3052 on line 3056, for supply to sequence registers 3008. Instruction status signals are supplied to the nanocode 2 PLA 132 on line 3058.

Sequencing the microcode ROM 120 through use of sequence registers 3008 reduces the number of inputs and outputs of the microcode ROM. Putting an additional level of sequencing around the nanocode allows the external microcode ROM 3000 to be used for constants as well as microinstructions. The control ALU can also be used by address registers as well as the sequence registers 3008 as a result. Further, some microcode reduction is possible by utilizing sequences of nanocodes. The nanocode sequence mechanism is very simple, since branching is handled at the microcode level.

The inclusion of a stack in the microprocessor saves microinstructions, by allowing a microinstruction to "call" a routine. The routine can be a complete instruction, such as floating point addition. Complex instructions, such as tangent, can be built up out of the sequence of simpler instructions, such as polynomial, which are themselves constructed from simpler instructions. As a result, the external microcode ROM 3000 does not need to be either very wide or very long. A width of 16 bits and a length of 4000 bits will handle most applications. Dividing the nanocode store into PLA 132 and ROM 128 reduces its size requirements. The nanocode 2 PLA 132 controls microcode sequencing and memory operations and the nanocode 1 ROM 128 controls the data path in the microprocessor. The sequencing nanocode is very small. Splitting the nanocode in this manner saves repeating non-active outputs throughout the nanocode store, and allows more combinations of sequencing operations, such as CALL-/RETURN, with data path operations. The microinstruction provides an address for both the PLA 132 and the ROM 128, plus an offset which is used to calculate the next microaddress in the case of a branch.

There are three steps involved for each control cycle, i.e., address calculation, microcode access, and nanocode access. The address calculation can be pipelined with the microcode and nanocode access, and the execution cycle.

The external microcode ROM 3000 has its own address and data bus, independent of the main CPU bus. The address range of this local bus is limited by the pin out restrictions of an integrated circuit package containing the microprocessor. Assuming a 64-pin package, a reasonable number of pins available for the external microcode ROM, address and data bus is 28, which may be split to give 16 bits of microcode word and 12 bits of address. In this case, only 4K words of external microcode are available. The number of words of external microcode can be increased by using an external random access memory instead of a ROM. The microcode can be downloaded from main memory to configure the microcode according to the nature of the task currently in execution. A further advantage of a local RAM for external microcode storage is that the on chip register storage can be extended using the RAM to store operands without involving the main memory.

In operation, new instructions can be added to the microprocessor 50 by adding microcode along, since enough nanocodes are implemented in the basic instruction set to cover all the likely possibilities. The microcode instructions added off chip are desirably higher level than the instructions implemented on chip and use much of the code already on the chip.

FIG. 16 shows how the microprocessors 50 of this invention are incorporated in a system 2453 including a central processing unit (CPU) co-processor 2451. The CPU 2451 is connected to an arbiter 3104 by bus 3106. The arbiter is connected to system bus 3108, which is in turn connected to decode logic 3110, and to system main memory 3112 by bus 3114. The decode logic 3110 is connected to the microprocessors 50 by buses 3116 and 3118. Additional buses (not shown) may connect the decode logic 3110 to additional microprocessor 50 (also not shown).

In operation, the microprocessors 50 will start computation after receiving an appropriate instruction via an XIO operation from the CPU 2451. The completion of the operation is sensed by the CPU 2451 either by testing the status registers of the microprocessors 50, or by receiving an interrupt request at the CPU 2451 from the microprocessors 50, notifying that the instruction registers of the microprocessors 50 are free for a new instruction. When a microprocessor 50 computation involves operations in a memory location, the CPU 2451 sends the microprocessor 50 the starting address in memory 3112 for reading/writing operands and results. IEEE standard operands are stored in memory 3112 with the least significant part in the lowest address. Military standard 1750A operands are stored with the most significant part in the lower address.

Each microprocessor 50 has five registers which may be accessed by the CPU 2451 for read/write operations and communications with main memory 3112. The CW (control word) register can be read/written with control information for the microprocessor 50. The AR (address register) can be read/written and if used to store the address for main memory 3112 accesses, allows the contents of a register file to be transferred to/form the host CPU 2451. The ST (status register) can only be read by the host CPU 2451 to examine status of the microprocessor 50. The IR (instruction register) can only be written in by the CPU 2451. The BR (buffer register) can only be written in with operands from main memory 3112. When the host CPU 2451 wants to access one of the register files, special "MOVE" instructions of the microprocessor 50 should be utilized, with the AR as source or destination. A "READ/WRITE AR" operation will then transfer the information to or from the host CPU 2451.

The microprocessor 50 of this invention is a general purpose floating point processor, since it can be connected to any CPU 2451 provided the proper decode circuitry 3110 is utilized. The microprocessor 50 is treated as an I/O device and may be connected either as a "memory mapped I/O" device or as a "programmed I/O" device. The connection mode chosen will affect the amount of external logic required and the performance of the system. By tailoring specific decode and control logic 3104 and 3110, the microprocessor of this invention can be used with, for example, the commercially available F9445, F9450, 8086, Z8000, M6800 and NS16000 micro-processors. Initialization of computation in the microprocessor 50 will be the same for all systems incorporating such commerically available microprocessors by using an XIO operation to send the floating point instructions to the microprocessors 50.

The completion of computation will differ from one CPU 2451 to another, depending on interrupt capabilities and system requirements.

DATA TYPES AND FORMAT

In the operation, the microprocessor 50 will support four floating point and two fixed point formats at follows:
  a. IEEE standard—single, double, double-extend.
  b. "Extended single" precision—32 bits mantissa and 8 bit exponent.
  c. MIL—1750A—Floating point package.
  d. Floating point decimals.
  e. 32 and 64 bit, 2's complement, integers.

The microprocessor 50 formats will recognize the following data types:
  a. Normalized operands.
  b. Denormalized operands.
  c. Normal Zero.
  d. Infinity.
  e. Not a Number (NaN's)

Single precision floating point data is represented in the microprocessor 50 in the following format:

| S | e | f |
|---|---|---|
| 0 | 1   8 9 | 31 |

This format is a 32-bit floating point number X divided as shown, with:
  S—1 bit Sign (1=negative)
  e—8 bit positive, biased exponent (b=127).
  f—23 bit fraction. Sign-magnitude representation.
where: $X=(-1)^s * 2^{(e-127)} * (1.f)$. The mantissa includes an implied leading "1".

Double precision floating point data is represented in the microprocessor 50 in the following format:

| S | e | f |
|---|---|---|
| 0 | 1   11 12 | 63 |

This format is 64-bit floating point number X, divided as shown, with:
  S—1-bit sign (1=negative)
  e—11-bit positive, biased exponent (b=1023)
  f—52-bit fraction. Sign=magnitude representation,
where: $X=(-1)^s * 2^{(e-1023)} * (1.f)$. the mantissa includes an implied leading "1".

Double-extended precision floating point data is represented in the microprocessor 50 in the following format:

| S | e | Man. (l.f) |
|---|---|---|
| 0 | 1   15 16 | 79 |

This format is an 80-bit floating point number X, divided as shown, with:
  S—1 bit sign. (1=negative)
  e—15 bit positive, biased exponent (b=16383).
  Man—64 bit Mantissa. Sign-magnitude representation, where: $X=(-1)^s * 2^{(e-16383)} * (1.f)$. In this format the leading bit is explicit.

"Extended single" precision floating point data is represented as follows:

| S | e | Man. (l.f) |
|---|---|---|
| 0 | 1   8 9 | 40 |

This format is a 41-bit floating point number, X, divided as shown, with:
  S—1 bit sign (1=negative)
  e—8 bit positive, biased exponent (b=127).
  Man.—32 bit Mantissa. Sign-magnitude representation,
where: $X=(-1)^s * 2^{(e-127)} * (1.f)$. The mantissa inlcudes, in this format, the leading "1" explicity. This format is useful in scientific function calculations to support greater accuracy.

The microprocessor 50 will support, "off-chip" only, two formats of floating point decimals, as follows:

| S | O's | Exp | Mant. |
|---|---|---|---|
| 0 | 1 2 3 4 | 15 16 | 79 |

This format is 80 bits wide for "single" and "double" precision floating point decimals, X, divided as shown, with:
  a. Single decimal, Xs:
    S—1 bit sign (1=negative)
    Exp.—3 digit exp.
    Mant.—16 digit Mantissa. Integer numbers, 7 least digits are zero.
  b. Double decimal, $X_D$:
    S—1 bit sign (1=negative)
    Exp.—3 digit exp.
    Mant.—16 digit Mantissa. Integer numbers.

The microprocessor 50 will support two formats of binary integers in 2's complement representation: 32 bits and 64 bits (64 bits, "off-chip" only).

The microprocessor 50 will handle the following data types:
  a. Normalized operands
  b. Denormalized operands
  c. Normal Zero, (±0)
  d. Infinity, (±∞)
  e. Not a Number, (NaN's) In order to support the data types b-e, the microprocessor 50 will reserve a number of format representation for this purpose as shown in Table III below:

TABLE III

| S | Biased Exp | Fraction | Interpretation |
|---|---|---|---|
| 0 | 0 | 0 | + Zero |
| 1 | 0 | 0 | − Zero |
| 0/1 | 0 | Not 0 | ± Denormalized Numbers |
| 0 | Max. exp. | 0 | + Infinity |
| 1 | Max. exp. | 0 | − Infinity |
| X | Max. exp. | 0, Not 0 | NaN (Not a Number) Non-trapping. |
| X | Max. exp. | 1, Not 0 | NaN. Trapping. |

The (±Zero) and ±denormalized) operands have a "0" leading bit.

The Instruction Set

The microprocessor 50 has one instruction format, as shown below:

| S | D | T | Function |
|---|---|---|---|

| 0 | 2 3 | 5 6 | 7 8 | 15 |
|---|---|---|---|---|

The fields have the following significance:
  S field: Defines the address of source operand.
  D field: Defines the address of destination operand.
  T field: Defines IEEE-STD format precision.
  Function: Defines the operation to be performed.
A detailed description of each field follows. For double and double-extended precisions, the user can specify as source, or destination, only registers 0,2,4, and 6.
  The "T" field has the following encoding:
    "00"—Single "10"—Double
    "01"—Extended-single "11"—Double-extend
Operations in this category may have one of the following forms:
  (1) Ri op Rj+Ri
  (2) Ri op Mj+Ri
  (3) Mi op Rj+Mi
The only exception is FRMD which has one form:
  Ri op Rj+Ri
The floating point instructions are as follows:
FADD
  Adds two operands in the specified precision and stores result in destination.
  operation: D+S→D.
FSUB
  Substracts source from destination and stores result in destination.
  operation: D—S→D
FMLT
  Multiplies two operand in the specified precision and stores result in destination.
  operation: D*S→D
FDIV
  Divides the destination by source and stores result in destination.
  operation: D/S→D
FSQT
  Computes the "square root" of the source operand and places result in destination.
  operation: square root (S)→D.
FRNI
  Computes the "Integer part" of the source operand and places result in destination.
  operation: Integer part [S]→D.
FRMD
  Computes the remainder between source and destination.
  Result is in destination.
  operation: D Remainder S→D.
  D Rem. S=D—{(integer part (D/S)) * S)}.
  note: S and D can only be in file registers.
FABV
  Computes the absolute value of the source operand and places result in destination.
  operation: |S|→D.

FEXG (optional)

Swaps the contents of the source and destination.
  operation: S←→D.

FNGT

Source operand is moved to destination with complemented sign.
  operation: S→D;
  sign(S)→sign(D)

FMOVS
  Moves the source operand to the single precision destination:
  S→D(single).
FMOVD
  Moves the source operand to the double precision destination:
  S→D(double).
FMOVDE
  Moves the source operand to the double-Ext. precision destination:
  S→D(double-Ext.).
FCMP
  Compares source operand and destination operand without affecting their contents. No result is to be delivered. Operation D—S;
  load "condition code" bits in status.
FEXM
  Examines the nature of the operand in (D) and places the result in the status register, bits EZ, EX, MZ, SN. The operand remains unchanged.

The microprocessor 50 supports integer instructions with the same instruction format as for floating numbers, shown above, except that "T" field has a different encoding as described below. These instructions are supported "off-chip" only.
  "T" field:
    00–32 bit integers
    10–64 bit integers
    11—Floating Point Decimals
    01–16-bit integers (optional)
As for floating instructions, each instruction is practically composed of 3 instructions depending on the origin of operands. Arithmetic operations will be performed in 2's complement. The integer instructions are as follows:
ADD
  Adds two operands and store result in destination.
  operation: D+S→D.
SUB
  Subtracts source operand from destination and stores result in destination. operation: D—S→D.
MLT
  Multiplies two operands and stores result in destination. operation: D*S→D;
  "T"="10" is illegal.
DIV
  Divides destination by source and stores result in destination. operation: D/S→D;
  "T"="10" is illegal.
CMP
  Compares between source and destination without affecting their contents.
  operation: D—S; load "condition code" bits in status.
MOV Moves the source operand to destination (same "T"!). operation: S→D.
AND (optional) AND's source and destination, result in destination.
  operation: D∧S→D.
OR (optional) OR's source and destination, result in destination.
  operation: D v S→D.
CPL
  Complements the source operand and place result in destination.
  operation: S→D.
SHR (optional)

Shifts right the operand defined by destination the number of places specified by the source. Result stored in destination. operation: D(shifted)→D; The shifts are logic shift.

SHL (optional)
Same as SHR but shifting direction if left.

Control instructions dealing with the control registers of the microprocessor 50 will be performed using pins ADDR0, 1 and W of the chip.

W=high: Read status or Read control registers.
W=low: Write in IR or control or AR1 or AR2 registers.

An instruction is provided to enable loading the RAM "off-chip" memory. This instruction (DWLD) will load constant blocks of 4K words in main memory from a starting address loaded in AR register, to the "off-chip" RAM. Additional instructions are provided to move data from the file registers to the AR registers and vice versa.

The microprocessor 50 supports several format conversion instructions from/to integers to/from floating point. The instruction format is as shown above, with "T" field having the encoding corresponding to the operand being converted. Each instruction is, practically, composed from 3 instructions depending on operand origin.

FLBD
A floating point source operand is converted to binary 32 bits integer and stored in destination. operation: conv.
(S)→(D)

FLBQ
A floating point source operand is converted to binary 64 bits integer and stored in destination ("off-chip" only).
operation: conv.
(S)→(D)

FLDCS
A binary floating point source operand ("single" or "double" precision only) is converted to a floating point single decimal and stored in destination ("off-chip" only).
operation: conv.
$(S)_B \rightarrow (D)_D$ FLDCD
A binary floating point source ("single" or "double" precision only) is converted to a floating point double decimal and stored in destination ("off-chip" only).
operation: conv.
$(S)_B \rightarrow (D)_D$ IGFS
An integer source operand (64 bits is "off-chip" only) is converted to a floating point operand in "single" precision and stored in destination.
operation: conv.
(S)→(D)

IGFD
An integer source operand (64 bits is "off-chip" only) is converted to a floating point operand in "double" precision and stored in destination.
operation: conv.
(S)→(D)

IGFDE
An integer source operand (64 bits is "off-chip" only) is converted to a floating point operand in "double-Ext." precision and stored in destination.
operation: conv.
(S)→(D)

DCSFL
A decimal single floating point operand is converted to a binary floating point number (in "single" or "double") and stored in destination ("off-chip" only).
operation: conv.
$(S)_D \rightarrow (D)_B$
note: In this instruction "T" field specifies the precision of the binary floating point number.

DCDFL
A decimal double floating point operand is converted to a binary floating point number (in "single" or "double") and stored in destination ("off-chip" only).
operation: conv.
$(S)_D \rightarrow (D)_B$
note: The note for DCSFL applies here too.

The microprocessor 50 also has a standard package of scientific function instructions (Sin, Cos, tg, Ctg, $a^x$, logX, etc.). These instructions are supported "off-chip" only.

The Status Word

Figure 17:
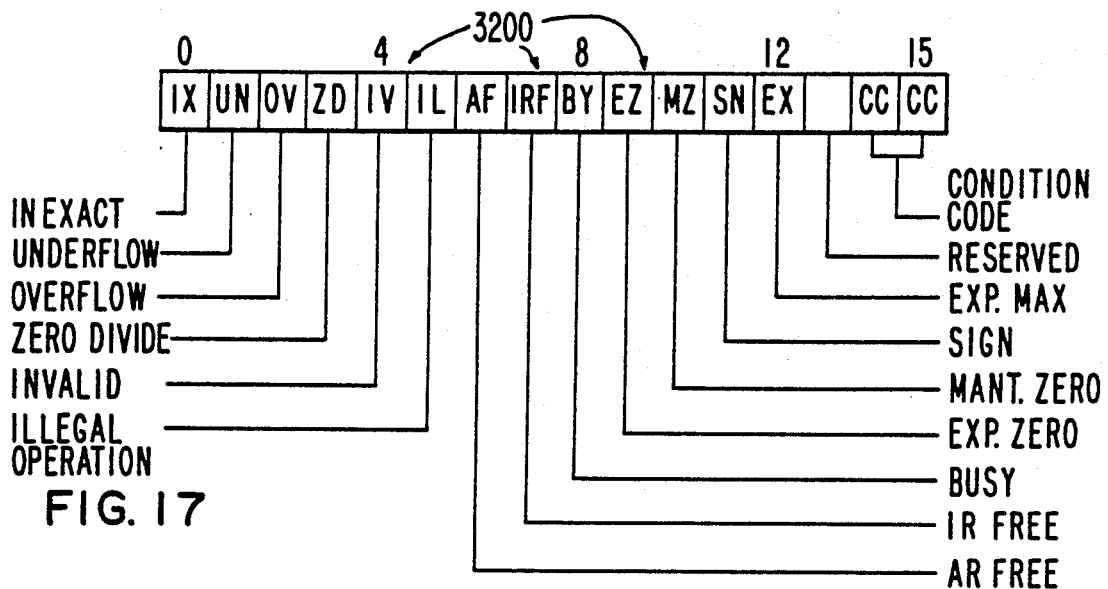
FIG. 17 depicts a preferred format of a status word of the floating point microprocessor integrated circuit of the present invention.
Figure 18:
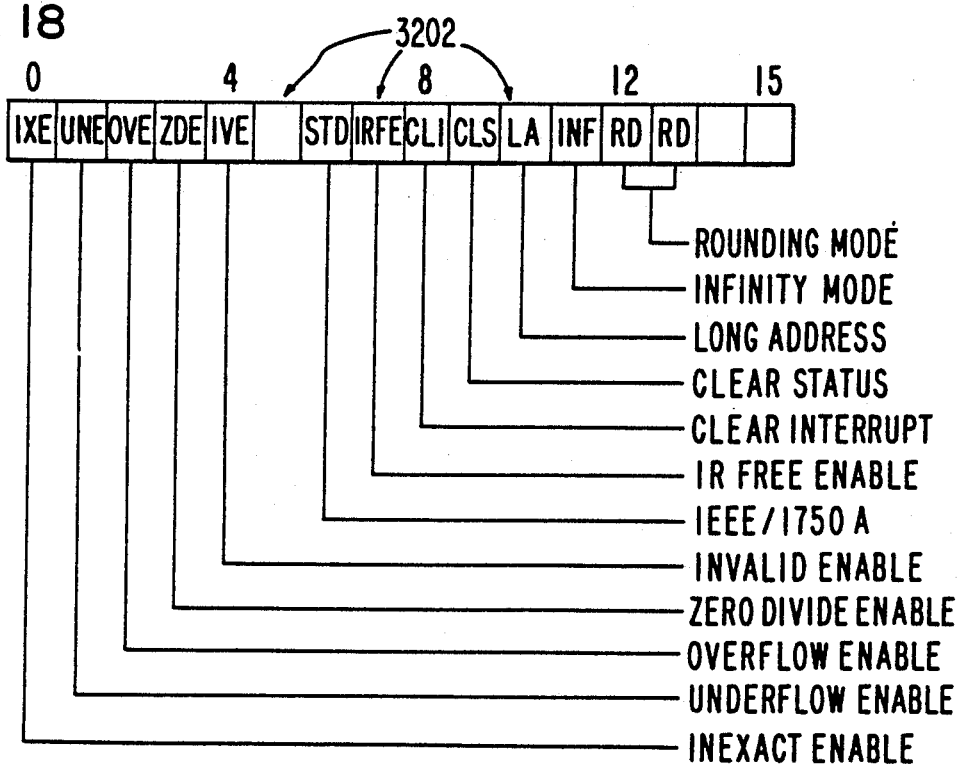
FIG. 18 depicts a preferred format of a control word of the floating point microprocessor integrated circuit of the present invention.

The status word of the microprocessor 50 contains information reflecting the status of the processor after the completion of an instruction. The bit positions are shown in FIG. 17. Bits in the status register may be set or reset during instruction execution. The CPU 2451 (FIG. 16) tests the status information by a read operation. The status register is cleared during "power-on reset". Individual status bits which caused traps will be cleared during the trap routine using "clear interrupts" bit in the control word (FIG. 18). Other status bits can be cleared using a special control bit. The signigicance of each bit position 3200 is shown in FIG. 17.

The control word contains information for interrupts control and other miscellaneous control bits for operation of the microprocessor 50. The bit positions 3202 are shown in FIG. 18, along with the significance of each position. The CPU 2451 (FIG. 16) may alter control bits by loading a new control word in the register. The control word can be tested in the CPU 2451 by a simple read operation. The register will be cleared during "Power-on reset."

The microprocessor 50 has two interrupt request lines:
a. Exceptions request (ERQ) This line will become active if an exception occured and the corresponding enable bit is "1". The exceptions and the "illegal operation" request will all share the same request line.
b. IR free request (IRFRQ) This line will become active whenever the microprocessor 50 is free, IRF=0, to receive a new instruction from CPU 2451 and the enable bit for "IRF" is "1".

In general: enable bit ∧ status bit=interrupt request. (The only exception is IRF ∧ enable bit=interrupt request). The ERQ line may become active only between microprocessor 50 instructions in order to enable completion of the current instruction. The microprocessor 50 will stop instruction execution whenever ERQ line is active. Execution may be resumend by one of the following operations:
a. Using the "control word" to clear the interrupts, by CLI.

b. Using the "control word" to clear status bits, by CLS. This will clear IRF too, and a new instruction will read to IR.

As can be seen from the above detailed description of the preferred embodiment, the present invention comprises a high performance floating point processor which can enhance the numeric processing power of another microprocessor, for example a general purpose 16 bit microprocessor. The microprocessor of the present invention implements the IEEE floating point standard, such as number representation, exception handling and rounding modes. The microprocessor of the present invention incorporates a fast ALU in order to achieve a significant speed improvement over the prior art. Furthermore, the microprocessor of the present invention incorporates capabilities to extend the chip to compute derived functions, such as trigonometric and hyperbolic functions, by means of external microprogrammable firmware additions.

As described in the detailed description, the microprocessor of the present invention comprises two interactive processors, one arithmetic and the other control. In the preferred embodiment, the arithmetic processor has a 16-bit exponent ALU for add and subtract; and a 32-bit mantissa ALU for add, subtract, multiply, divide and square-root. The maximum speed of the mantissa computation is achieved by the use of a full carry-look-ahead 32-bit adder, and a logarithmic shifter. The shifter can shift up to eight positions to the left, or up to 24 position to the right in one step. The shifter is used in conjunction with recoding of the multiplier/dividend/partial-remainder to speed up normalization, multiplication and division. The microprocessor includes PLA's which examine a string of eight-bits in the temporary registers, and determine the amount of shifts (up to eight) in the subsequent add/subtract/move operation. Square root operations use a standard "two-bits at a time" algorithm. The mantissa ALU has three 32-bit working registers, and an 8*32 register file. Interface with the outside world is achieved by a 32-bit buffer register, and 2×32 and 1×16 unpacking registers. PLA's are used to control the ALU's and the 32-bit data paths.

The control scheme of the microprocessor of the present invention minimizes the on-chip ROM storage, while allowing microcode extensions off the chip without excessive pin-out requirements. Nano operations, which affect the nano and microcode sequencing mechanism, are described as follows. Included in this class are memory operations, which involve the sequencing ALU for address calculation, branch and jump operations, operations on sequencing registers, stack operations, instruction decode, and microcode status.

A branch is invoked by specifying a nano 1 instruction which includes a branch condition. All microinstructions are therefore potential branches. If a branch is taken, the address of the next microinstruction is changed to PC+offset instead of PC+1. This only occurs if the respect jump (RJ) bit is set in the NANO 2 code, since this should only occur on a microinstruction fetch, not a "constant" fetch from the microcode space. Since the previous microinstruction becomes invalid, it must be inhibited if the branch is taken. This is achieved by forcing the "inhibit" on the NANO 1 code active. The NANO 2 code is inhibited in a different way, since no inhibit mechanism is implemented for the NANO 2 code. One of the inputs to the NANO 2 PLA is the branch (BRCH OR BRCH+1) signal. When this is active, the NANO 2 PLA reverts to the default term, which is PC increment and fetch new microinstruction.

Jumps are double word microinstructions. The addressing range covers the entire microinstruction space. The address is absolute. The jump is unconditional. If a jump is combined with a branch, the branch offset address will be added to the jump address if the branch is taken. Otherwise, the resultant address will be the jump address. Since the jump micro-instruction takes up two lines of microcode, it requires a sequence of two Nano 2 instructions to implement. These can be overlapped with a sequence of Nano 1 operations.

A fast jump causes the microcode to jump to PC+OFFSET. There is no addition cycle required for this, as in branch. The fast jump is coded in the N2 field of the micro-instruction. It cannot therefore be combined with any other N2 operations (for example, long jump, read, call, etc.). A fast jump may be preceeded by a branch. If the branch is not taken, the fast jump proceeds normally. If the branch is taken, the offset from the branch instruction is added to the PC, instead of the "fast jump" offset. The fast jump may be combined with a branch. If the branch is taken, then the offset will be added twice to the PC.

The subroutine call operates in a similar manner to "long jump". The "jump address" is placed in the LJUMP register, while at the same time the PC is saved in the stack. The first case of call is the on-chip stack not-full. The subroutine return instruction is used for two purposes: either a genuine return, or a fetch of the next instruction from the instruction register (IR).

A read operation is initiated by the NANO2 code. Either main memory or local memory can be read. The operand read is unloaded through the unpacker, 16-bits at a time. The unpack counter logic determines the correct loading procedure, and the termination of the read, according to the precision. Operations in the ALU which do not use branch, may be overlapped with the read operation.

The write operation is carried out by a combination of NANO1 and NANO2 operations. Thus it is not overlapped in the same manner as a read. The S-register is used to hold a count, depending on the precision. The write operation is repeated until the count becomes zero while the temporary register (64-bits) is shifted, 16 bits to the right every cycle. Double extended write requires an additional pre-write to output the exponent.

In both read or write, the address is found in the address register, which is always incremented during the memory operation. In the case of an instruction where both one operand and the result are in the same memory location, the address register must be pre-decremented, by a number depending on the precision. In the case of a 32-bit address mode, the timing logic will ensure that both ARH and ARL are output to the bus in sequence. There is no automatic increment on the ARH register. The first cycle of a main memory addres is extended to allow for bus arbitration.

There are two cases of local memory address. First, is read microcode, where the microcode is read from the local memory instead of the on-chip memory, whenever the microcode address exceeds the local memory range. The next case is stack operation. The address source is the stack pointer (SP), which is incremented or decremented during the stack operation. The third case is operand read/write. These operations read or write data to the local memory. They operate in a similar manner to main memory read or write. However, the address source is the data pointer (DP), rather than the address register (AR). The DP is always incremented during the read or write operation. There is no "extended cycle" required for bus arbitration, since the local bus has exclusive use privilege.

The starting mechanism is as follows. After power on, a reset must be applied. The reset forces the state counter to cycle regardless of the external synchronization signals (for example RDY). The reset input is internally synchronized (latched). Selected status flags and flip/flops are reset. The nanocode address is forced to zero. The NANO1 code cycles on a NOP, while the NANO2 code cycles on a "return". Since the stack is empty, the "return" is hunting for a new instruction. As soon as an instruction is loaded into the instruction register, the microcode will be addressed and the microcode sequence activated.

NANO1 sequence is performed as follows. The microcode defines the starting address of the NANO1 code sequence. A 3-bit NANO-offset is used to sequence through the NANO code, during a microinstruction. There are two types of NANO1 code sequencing: offset control and condition control. In the offset control type, a sequence of NANO1 steps keeps the terminate bit (from NANO1 output) at zero. At the last step, this is set to a 1. This releases the next NANO1 address and allows the program controller (PC) to increment. It is possible that at the completion of a NANO1 sequence, a NANO2 sequence is in progress. In this case, the inhibit bit is forced active, to inhibit further NANO1 operations until the NANO2 terminate bit becomes active. When both inhibits are active, the operation proceeds as above. The last term of a NANO sequence must have a zero offset. In the condition control type of NANO1 code sequencing, a "freeze" condition code in the NANO 1 output will inhibit the NANO1 ROM output register clock until some condition is met. The effect is that the same NANO1 operation will repeat until the condition becomes true. The terminate bit during this cycle is a 1, to allow the new NANO1 address through, so that the next instruction is ready at the latch input, waiting for the nano to clock. During this time, the PC is inhibited from loading (incrementing).

NANO2 sequencing is similar to NANO1 sequencing. Since the NANO2 code is in a PLA, it has many more "address" inputs. The principle starting address is a 3-bit code from the microinstruction. An additional 3-bit code from the microinstruction (the least significant bits of NANO1 address) defines the starting address of non-overlap NANO2 instructions. Additional status inputs modify the starting address according to the status of the machine (for example stack full, instruction register empty, etc.). There is only one type of NANO2 sequencing. That is, a 2-bit NANO2 offset is fed back from the latched output of the NANO2 PLA. A terminate bit defines the last cycle. In the case that the NANO2 sequence has finished, while the NANO1 sequence has not finished, the NANO2 code will cycle on its last cycle (PC+1—PC), but the PC loading is inhibited.

Normally, the microcode is addressed by the program controller for microcode sequencing. However, there are two sources for the microcode address in addition to the program controller. These are the instruction register (decode) and the long jump register (LJUMP). The IR source for the address is used to start a "new" instruction. The LJUMP source is used during long-jump, call, and return microinstructions. In all cases, the micro address is incremented (or modified) and written back to the PC. For sequencing through the microcode, the micro address is normally incremented, but a branch, fast-jump, will add an offset (in the microinstruction) to the address, while a long-jump, call or return will substitute an absolute address.

As previously described, the instruction takes the form S, D, T, F; where S is the source (3-bits), D is the destination (3-bits), T is the type (2-bits), and F is the function (8-bits). All ten bits of the T and F fields are input to the decode PLA. The output of this decode is a 13-bit address. The mapping covers both on-chip and off-chip microcode. The most significant bit is a 1 for off-chip addresses. For the on-chip mapping, starting addresses are on 4-word boundaries distributed throughout the microcode address space. The off-chip addresses are defined on 2-word boundaries at the bottom of each 1K block of external microcode.

The SDT register is normally 16 bits wide. It is set by a 2-word microinstruction. The second word contains the immediate value to be loaded into SDT register. The SDT register has the following form: S, D, T and FLAGS, where S, D and T have the same form as the instruction. The FLAGS are used to select BR as a source/destination; to validate the SDT register, to select the default rounding mode; as general purpose flags (can be used in branch); and to select integral/decimal mode for the unpacker.

The AR registers, although normally loaded by the hoist processor (a synchronously), can also be loaded from the register file. This is to allow more complex address calculations (for example, during matrix operation) to be performed in the mantissa ALU. The only transfer possible loads both AR registers with the contents of a 32-bit register in the file. An additional NANO 2 instruction will transfer the contents of the register back to the host processor or register file.

The operation of the control scheme of the preferred embodiment, in conjunction with a host processor, is as follows. The host processor is responsible for loading the address registers (if required) and the instruction register. This communication treats the host processor as an I/O device. The instruction register can be loaded while a previous operation is in execution. The instruction causes an entry into the microcode, depending on a PLA table. This microcode could be on or off-chip. Each microcode instruction contains a pointer to a corresponding nanocode instruction. The nanocode instructions arre shared, and they consist of short sequences. Although most micro-instructions are single word instructions, an optional format allows double word format. The second word has a number of uses. It is used to change the microcode status, to load the data pointer or porvide a "long" microcode address for some jump and microcode call instructions. The control scheme of the present invention has the advantage of allowing complex routines to be microcoded for high speed implementation of desired functions. The complexity of these functions can range from the standard trigonometric function (SIN, COS, TAN, etc.) to away operations and advance mathematical functions.

The major features of the preferred embodiment of the control scheme of the present invention include the following. Two level microcode which allows long routines to be vertically encoded without the overhead of a large number of ROM outputs. Off-chip writable control store allows large extensions to the basic instruction set. External microcode can be stored in standard high speed ROM/PROM, or can be in RAM and down loaded from a host processor. Split nanocode ROM allows simultaneous execution of an arithmethc operation and an operand fetch to maximize throughput. Shared sequencing ALU handles all microcode sequencing plus memory address sequencing. This simplifies the architecture by enabling the use of a single ALU. Nanocode sequencing allows storage of constants and data in the microcode space, which is important for the off-chip microcode. Stack registers provide a means of utilizing microcode as micro-subroutines inside large functions. Pointer registers provide an efficient way to access data and constants from main memory or local memory. A microcode status register gives the microcode the ability to alter the register assignments, precision and rounding mode of standard routines, to optimize the use of the microcode. Instruction, control and status registers are loaded or read by the host processor to initialize an operation, to set up parameters of that operation and to check the exception flags.

It should now be readily apparent to those skilled in the art that a microprocessor system and microprocessor integrated circuit capable of achieving the stated object of the invention has been provided. The system organization of this microprocessor allows the microprocessor to carry out both a greater number of different instructions and more complex instructions than possible with prior art floating point microprocessors. THe hierarchical control system organization employed in this microprocessor reduces time delays present in prior art heirarchical control systems suitable for use with off chip microinstructions. As a result, this high speed processor is capable of carrying out a larger number of different arithmetic and other numeric operations with real time response and at a higher speed than with prior art microprocessors. It is also capable of handling floating point operations in accordance with the IEEE standard or military standard.

The split nanocode memory of the present invention allows simultaneous execution of arithmetic operations and an operand fetch. That is, one portion enables performance of arithmetic operations in parallel with the second portion which enables performance of controlled operations; for example, selection of the next address, which can be performed before the arithmetic operation is completed. This feature enhances the speed of the microprocessor. Shared sequencing in the ALU enables a single ALU to handle all nanocode sequencing as well as memory address sequencing. The nanocode sequencing, in accordance with the present invention, enables storage of constants and data in th microcode space.

In addition, the present invention enables a significant increase in speed of operation because of the overlapping of execution of microcode and nanocode which is enabled by the architecture of the present invention. Speed of operation is also enhanced by pipelining of the microinstructions; that is, one microinstruction can be executed while the subsequent microinstruction is being decoded.

It should further be apparent to those skilled in the art that various changes in form and details of the invention as shown and described may be made. It is intended that such changes be included within the spirit and scope of the claims appended hereto.

What is claimed is:
1. A microprocessor comprising:
  (a) an instruction sequence register having an instruction address and connected to provide said instruction address to means for storing a first level of instruction;
  (b) a first level instruction register connected to receive a first level instruction from said first level instruction storage means;
  (c) means for storing a second level of instructions connected to receive an address from said first level instruction register, said second level instruction storage means comprising:
    (i) first means for storing a first portion of said second level instruction; and
    (ii) separate second means for storing a second portion of said second level instructions,
  (d) a first, second level instruction register connected to receive said first portion of said second level instruction; and,
  (e) a second, second level instruction register connected to receive said second portion of said second level instructions, wherein said first and second, second level instruction registers are connected to supply instruction portions to said first means for storing a first portion of said second level instructions and said separate second means for storing a second portion of said second level instructions respectively and at least a portion of instructions output from said first, second level instruction register is coupled to an input of said instruction sequence register through branch control means.

2. A microprocessor in accordance with claim 1 wherein said first level instruction register is connected to provide an address to said instruction sequence register.

3. A microprocessor in accordance with claim 1 wherein at least a portion of instructions output from said first, second level instruction register is coupled to a control input of at least one arithmetic logic unit for controlling data movement in said microprocessor.

4. A microprocessor in accordance with claim 3 wherein at least a portion of instruction output from said second, second level instruction register is coupled to an input of said instruction sequence register for controlling first level address sequencing and operation of said means for storing a first level of instructions.

5. A microprocessor in accordance with claim 4 wherein said first means for storing a first poriton of said second level instructions comprises a read only memory.

6. A microprocessor in accordance with claim 5 wherein said second means for storing a second portion of said second level instructions comprises a programmable logic array.

7. A microprocessor in accordance with claim 4 additionally comprising means for connecting, in parallel with said means for storing a first level of instructions, external means for storing additional first level instructions.

* * * * *